United States Patent
Nanba

Patent Number: 5,949,161
Date of Patent: Sep. 7, 1999

[54] LINEAR DRIVE DEVICE

[75] Inventor: Katsuhiro Nanba, Okazaki, Japan

[73] Assignee: Minolta Co., Ltd., Osaka, Japan

[21] Appl. No.: 08/967,099

[22] Filed: Nov. 10, 1997

[30] Foreign Application Priority Data

Nov. 11, 1996 [JP] Japan ................................ 8-298378
Nov. 11, 1996 [JP] Japan ................................ 8-298627

[51] Int. Cl.$^6$ .................................................. H02K 41/00
[52] U.S. Cl. ............................................. 310/12; 318/135
[58] Field of Search ................................. 310/12, 13, 14, 310/68 B; 318/135

[56] References Cited

U.S. PATENT DOCUMENTS

| | | | |
|---|---|---|---|
| 5,072,144 | 12/1991 | Saito et al. | 310/12 |
| 5,536,983 | 7/1996 | Avaki et al. | 310/12 |
| 5,801,462 | 9/1998 | Yagoto et al. | 310/12 |

FOREIGN PATENT DOCUMENTS

| | | | |
|---|---|---|---|
| 61-009161 | 1/1986 | Japan . | |
| 6-225513 | 8/1994 | Japan | 310/14 |

*Primary Examiner*—Thomas M. Dougherty
*Assistant Examiner*—Judson H. Jones
*Attorney, Agent, or Firm*—Sidley & Austin

[57] ABSTRACT

A linear drive device comprising a shaft extending in a predetermined direction and provided with a field magnet having N- and S-type magnetic poles; and a movable piece having an armature coil fitted around the shaft and opposed to the field magnet for generating a thrust when energized, being reciprocatable along the shaft, and connected to one end of a driven object, wherein thrusts generated by the armature coil at opposite sides of the shaft are determined such that the thrust generated at the side near the driven object is larger than the thrust generated at the side remote from the driven object. A linear drive device comprising a guide member; a movable piece engaged with the guide member for reciprocation along the guide member; and a sensor arranged on the movable piece for reading information on the guide member, wherein the sensor arranged on the movable piece is located substantially at a center of a yawing or pitching motion of the movable piece.

30 Claims, 13 Drawing Sheets

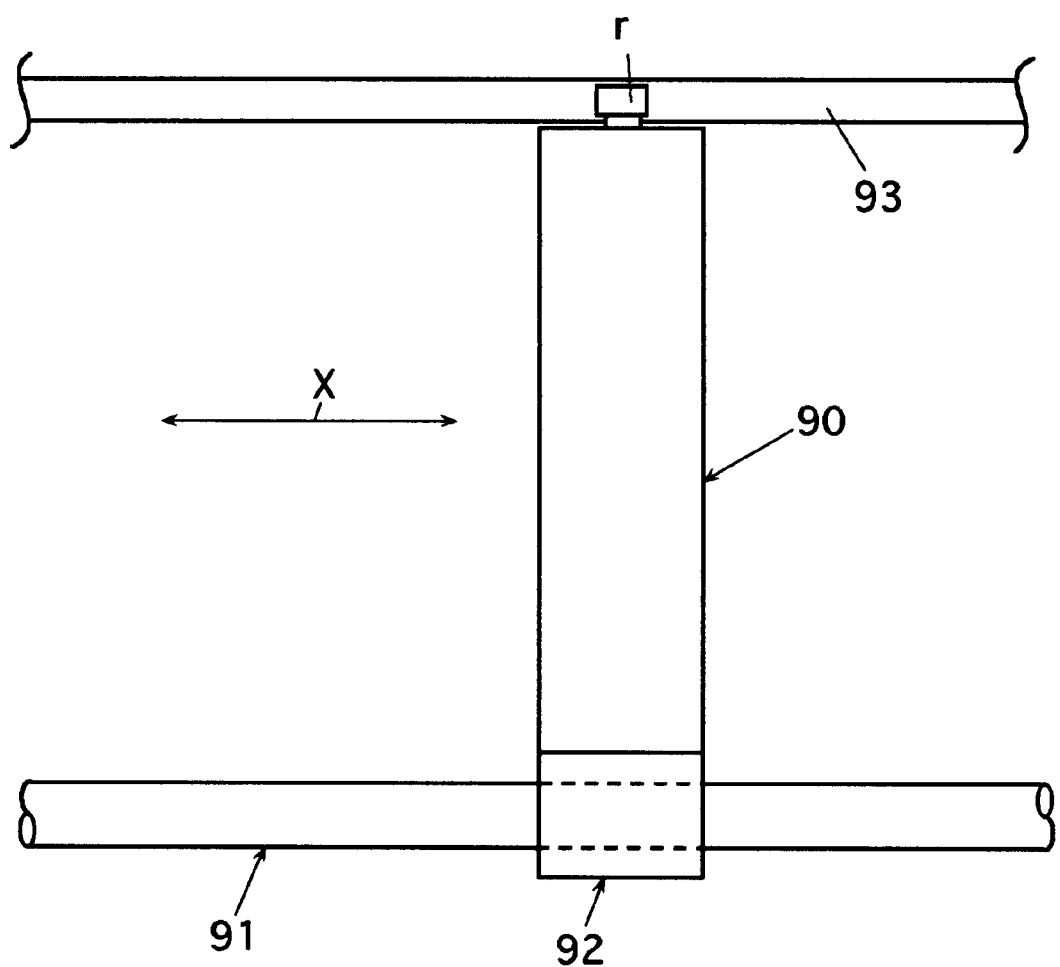
Fig.9(PriorArt)

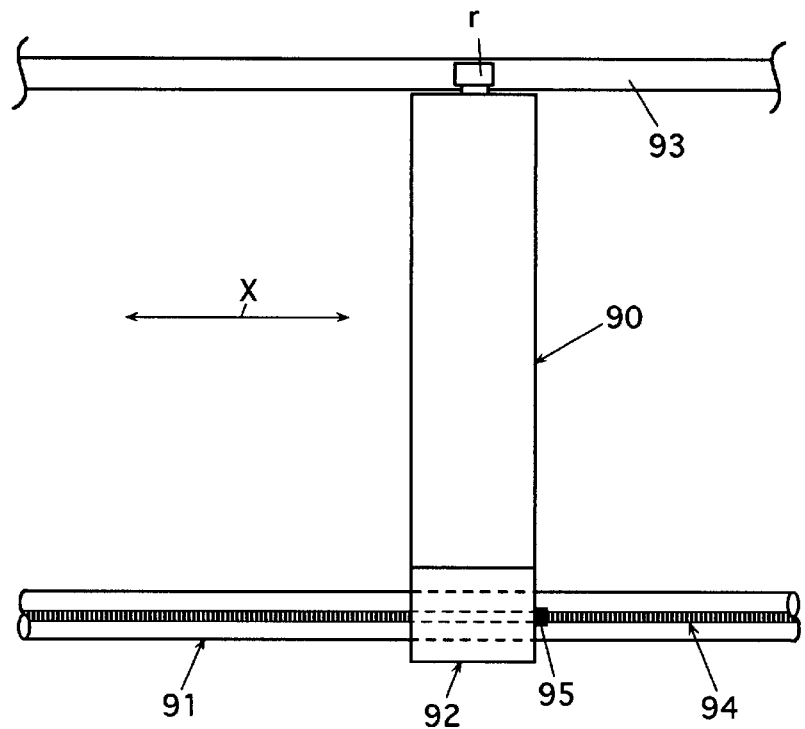
Fig.10(PriorArt)
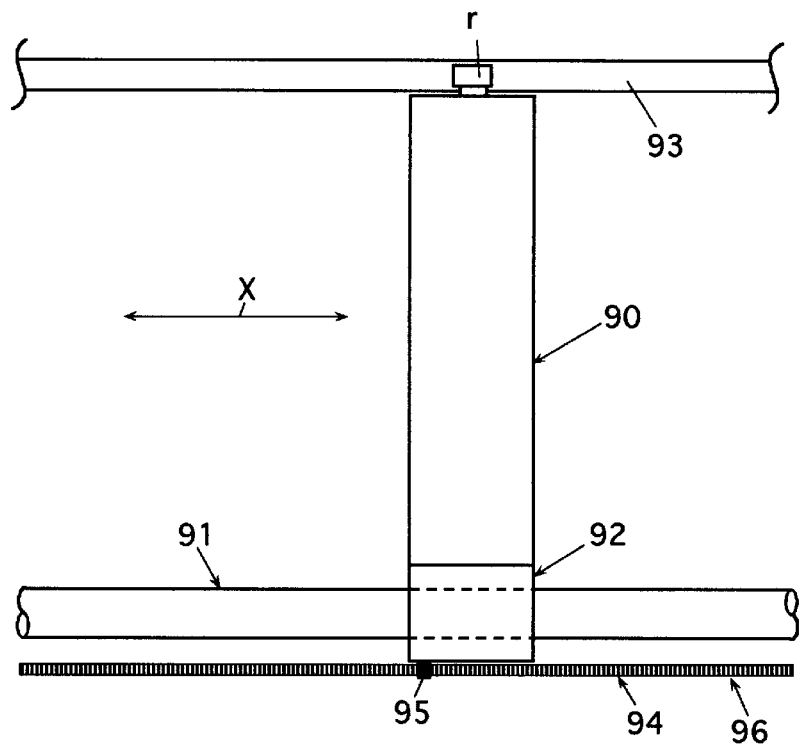
Fig.11(PriorArt)

Fig.12(A)(PriorArt)
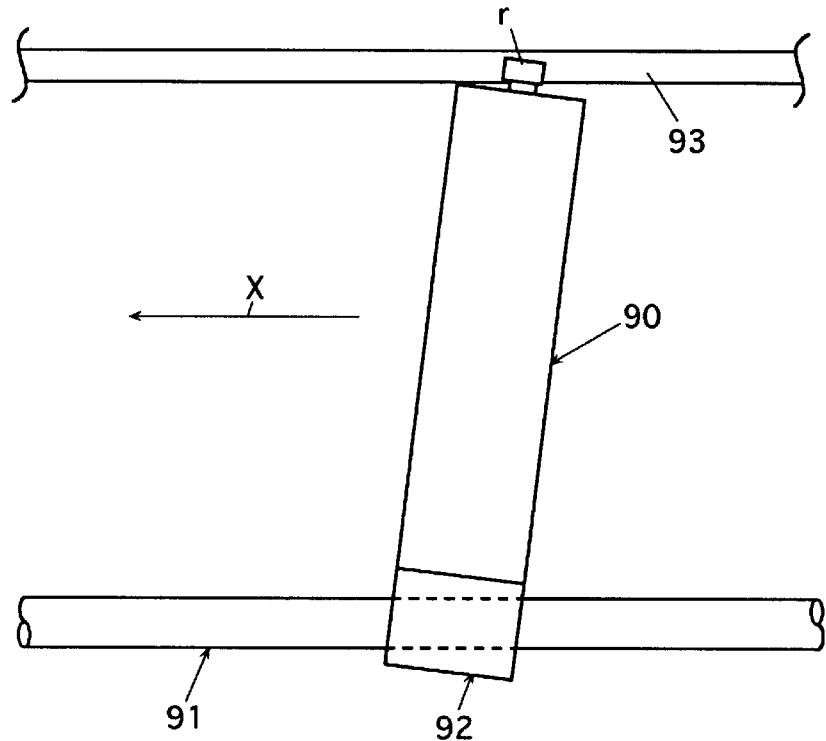
Fig.12(B)(PriorArt)
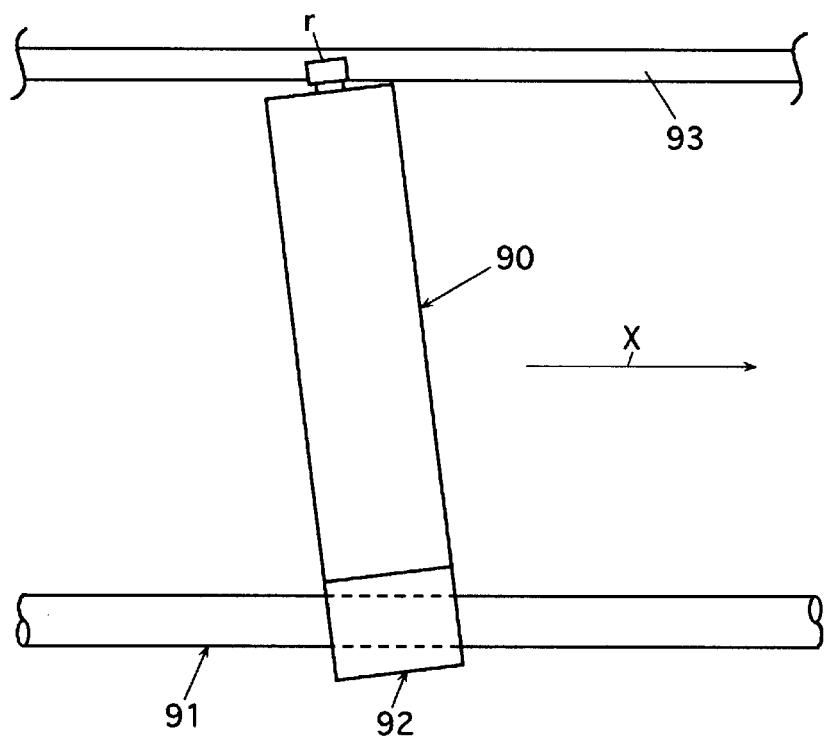

Fig.14(PriorArt)
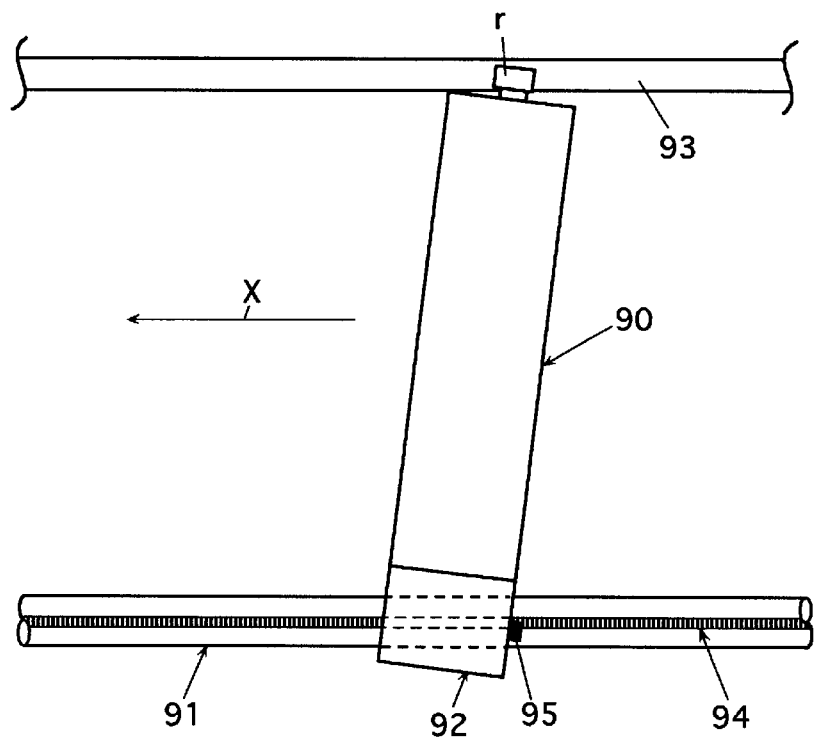
Fig.15(PriorArt)
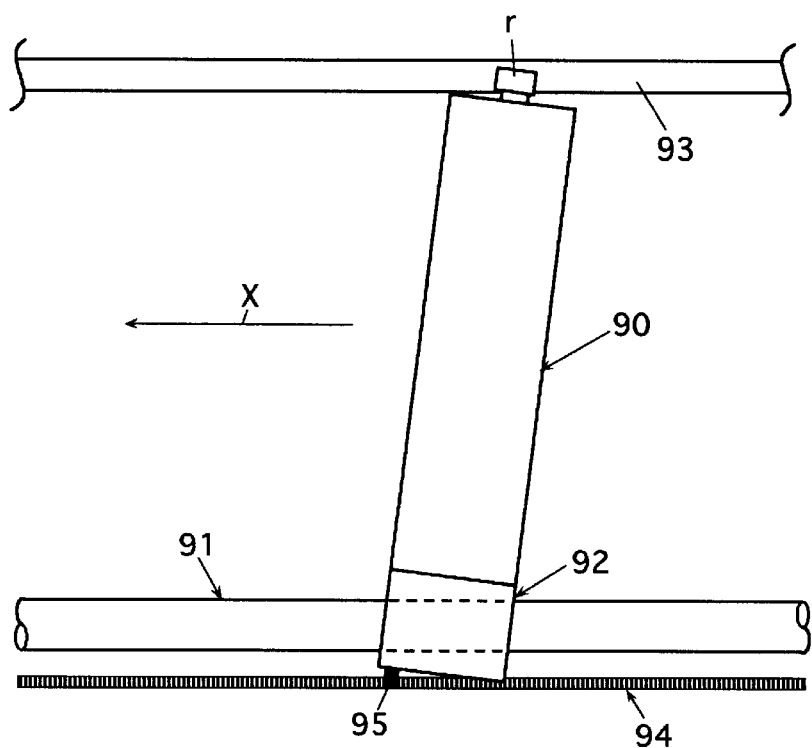

LINEAR DRIVE DEVICE

BACKGROUND OF THE INVENTION

1. Field of the Invention

The present invention relates to a linear drive device which can linearly drive a driven object (i.e., an object to be driven or a drive target member), e.g., a slider carrying an optical part in an image reading apparatus for optically scanning and reading an original document, in a predetermined direction perpendicular to a direction of a width of the driven object.

2. Description of the Related Art

In various fields relating to office automation equipment such as copying machines, image scanners and printers, factory automation equipment such as X-Y tables and object transporting apparatuses, and optical equipment such as cameras, it is required to transport or move an object linearly in a predetermined direction.

The object to be moved linearly is driven linearly, for example, in the following manner.

As shown in FIG. 9, for example, a driven object 90 can be driven in an X direction by driving a movable piece 92, which is reciprocatable in the X direction and is connected to an end, in a direction perpendicular to the X direction, of the driven object 90. The movable piece 92 is arranged reciprocatable along a guide member 91 extending in the drive direction, i.e., X direction. For keeping an attitude of the driven object 90 during travel and other purposes, a roller r or the like, which can roll on a plate-like guide member 93 extending in the X direction, is arranged at the other end of the driven object 90 remote, in the width direction of the driven object 90, from the end connected to the movable piece 92.

The movable piece 92 can be driven, for example, in the following manner.

For example, a linear motor may be employed. In this linear motor, a field magnet provided with N- and S-type magnetic poles which are arranged alternately in the X direction is formed at the guide member 91, and an armature coil opposed to the field magnet is arranged in the movable piece 92. Thereby, the movable piece 92 can be driven in the X direction by energizing the armature coil.

Alternatively, by transmitting a drive force, e.g., of a rotary motor arranged outside the movable piece 92, to the movable piece 92 through a drive force transmitting mechanism formed of, e.g., wire and pulleys, the movable piece 92 can be also driven in the X direction.

For driving the driven object 90 in the X direction by the above structure wherein the end of the driven object 90 is connected to the movable piece 92 driven in the X direction, a linear encoder may be employed for controlling driving of the movable piece 92 and therefore the driven object 90. The linear encoder is formed of an encoder chart extending in the X direction and a sensor which is arranged at a position on the movable piece 92 opposed to the encoder chart for reading held on the encoder chart. Encoders of an optical type and of a magnetic type are known.

An encoder chart 94 is arranged on the guide member 91, for example, as shown in FIG. 10. As shown in FIG. 11, the chart 94 may be arranged on a chart member 96 arranged in parallel with the guide member 91 and therefore extending in the X direction. In FIGS. 10 and 11, 95 indicates sensors for reading information on the encoder chart 94.

In the above structure having the movable piece 92, which is connected to one end, in the width direction, of the driven object 90 for driving the object 90 in the X direction perpendicular to its width direction, the other end (free end) of the driven object 90 which is not connected to the movable piece 92 moves with a delay from the movement of the end (driven end) connected to the movable piece 92 as shown in FIGS. 12(A) and 12(B) so that the driven object 90 may not be driven precisely with a stable attitude. It can be considered that the above instability and more specifically yawing of the driven object 90 is caused by a motion resistance applied to the free end of the driven object 90 and a pulling force applied to the driven end thereof by the movable piece 92. The yawing of the driven object 90 becomes further remarkable when the driven object 90 does not have a balanced weight distribution in the width direction, and particularly when the free end of the driven object 90 is heavier than the driven end. Pitching may also occur at the driven object 90 during driving. On rectangular coordinates shown in FIG. 13, it is assumed that the x-axis defines the aforementioned X direction and the y-axis defines the width direction of the driven object 90. In this case, the yawing is swinging around the z-axis, and the pitching is swinging around the y-axis.

When the yawing and/or pitching of the driven object 90 and the movable piece 92 occur in the structure provided with the encoder, the sensor 95 on the movable piece 92 may not occupy a stable position with respect to the encoder chart 94 as shown in FIGS. 14 and 15, and a distance between the sensor 95 and the chart 94 varies so that the sensor 95 cannot stably detect the information. Also, the sensor 95 may be shifted from a position opposed to the chart 94, and thereby cannot read the information on the encoder chart. As a result, the driven object 90 cannot be driven precisely when driving of the movable piece 92 is con trolled based on th e information detected by the sensor 95.

SUMMARY OF THE INVENTION

Accordingly, an object of the invention is to provide a linear drive device which includes a guide member extending linearly in a predetermined direction, and a movable piece engaged with the guide member for reciprocation in the predetermined direction along the guide member and connected to an end of a driven object for linearly driving the driven object in the predetermined direction, and more particularly to provide a linear drive device which can precisely and stably drive the driven object.

Another object of the invention is to provide a linear drive device which can suppress yawing and thereby can precisely and stably drive the driven object. another object of the invention is to provide a linear drive device provided with a linear encoder, in which encoder chart information can be precisely and stably read with an encoder sensor arranged on a movable piece even when the movable piece yaws, and thereby can precisely and stably drive the driven object.

Yet another object of the invention is to provide a linear drive device provided with a linear encoder, in which encoder chart information can be precisely and stably read with an encoder sensor arranged on a movable piece even when the movable piece pitches, and thereby can precisely and stably drive the driven object.

In order to achieve the above objects, the invention provides linear drive devices of the following four types (1)–(4)

(1) A linear drive device (a linear drive device of the first type) for linearly driving a driven object in a predetermined direction perpendicular to a direction of a width of the driven object, comprising a shaft extending in the predetermined direction and provided with a field magnet having N- and S-type magnetic poles arranged alternately in the predetermined direction; and a movable piece having an armature coil fitted around the shaft and opposed to the field magnet for generating a thrust in the predetermined direction when energized, being reciprocatable along the shaft, and connected to one end, in the width direction, of the driven object, wherein thrusts generated by the armature coil at opposite sides, in the width direction of the driven object, of the shaft are determined such that the thrust generated at the side near the driven object is larger than the thrust generated at the side remote from the driven object.

(2) A linear drive device (a linear drive device of the second type) for linearly driving a driven object in a predetermined direction perpendicular to a direction of a width of the driven object, comprising a guide member extending in the predetermined direction; a movable piece having an armature coil, being reciprocatable along the guide member and connected to an end, in the width direction, of the driven object; a first stator extending linearly in the predetermined direction, having a field magnet provided with N- and S-type magnetic poles arranged alternately in the predetermined direction, and arranged at one of the opposite sides, in the width direction of the driven object, of the guide member neighboring to the driven object; and a second stator extending linearly in the predetermined direction, having a field magnet provided with N- and S-type magnetic poles arranged alternately in the predetermined direction, and arranged at the other side, in the width direction of the driven object, of the guide member remote from the driven object, wherein a thrust in the predetermined direction generated by energizing the armature coil subjected to a magnetic field formed by the field magnet of the first stator is larger than a thrust in the predetermined direction generated by energizing the armature coil subjected to a magnetic field formed by the field magnet of the second stator.

(3) A linear drive device (a linear drive device of the third type) comprising a guide member extending linearly in a predetermined direction; a movable piece engaged with the guide member for reciprocation in the predetermined direction along the guide member; and a sensor arranged on the movable piece for reading information on the guide member, wherein the sensor arranged on the movable piece is located substantially at a center of a yawing motion of the movable piece occurring during travel of the movable piece along the guide member.

(4) A linear drive device (a linear drive device of the fourth type) comprising a guide member extending linearly in a predetermined direction; a movable piece engaged with the guide member for reciprocation in the predetermined direction along the guide member; and a sensor arranged on the movable piece for reading information on the guide member, wherein the sensor arranged on the movable piece is located substantially at a center of a pitching motion of the movable piece occurring during travel of the movable piece along the guide member.

In any one of the linear drive devices of the first to fourth types described above, when the movable piece is connected to one of the ends, in the width direction of the driven object, of the driven object, the driven object can be driven linearly in the predetermined direction perpendicular to the width direction.

In the linear drive devices of the first and second types described above, the yawing of the movable piece and the driven object connected thereto can be suppressed, and thereby the movable piece and the driven object can be driven precisely and stably.

In the linear drive device of the third type described above, when, for example, a linear encoder having an encoder chart arranged at the guide member and the sensor arranged on the movable piece is employed, the sensor arranged on the movable piece can precisely and stably read the encoder chart information even when the movable piece and the driven object yaw, and thereby the driven object can be driven precisely and stably based on the encoder information.

In the linear drive device of the fourth type described above, when, for example, a linear encoder having an encoder chart arranged at the guide member and the sensor arranged on the movable piece is employed, the sensor arranged on the movable piece can precisely and stably read the encoder chart information even when the movable piece and the driven object pitch, and thereby the driven object can be driven precisely and stably based on the encoder information.

The foregoing and other objects, features, aspects and advantages of the present invention will become more apparent from the following detailed description and the accompanying drawings.

BRIEF DESCRIPTION OF THE DRAWINGS

FIG. 9 is a schematic plan view of an example of a linear drive device in the prior art;

FIG. 10 is a schematic plan view of an example of a linear drive device provided with a linear encoder in the prior art;

FIG. 11 is a schematic plan view of another example of the linear drive device provided with the linear encoder in the prior art;

FIGS. 12(A) and 12(B) show yawing of a movable piece in the linear drive device shown in FIG. 9;

FIG. 14 shows yawing of the movable piece in the linear drive device shown in FIG. 10; and FIG. 15 shows yawing of the movable piece in the linear drive device shown in FIG. 11.

DESCRIPTION OF THE PREFERRED EMBODIMENTS

Figure 1A:
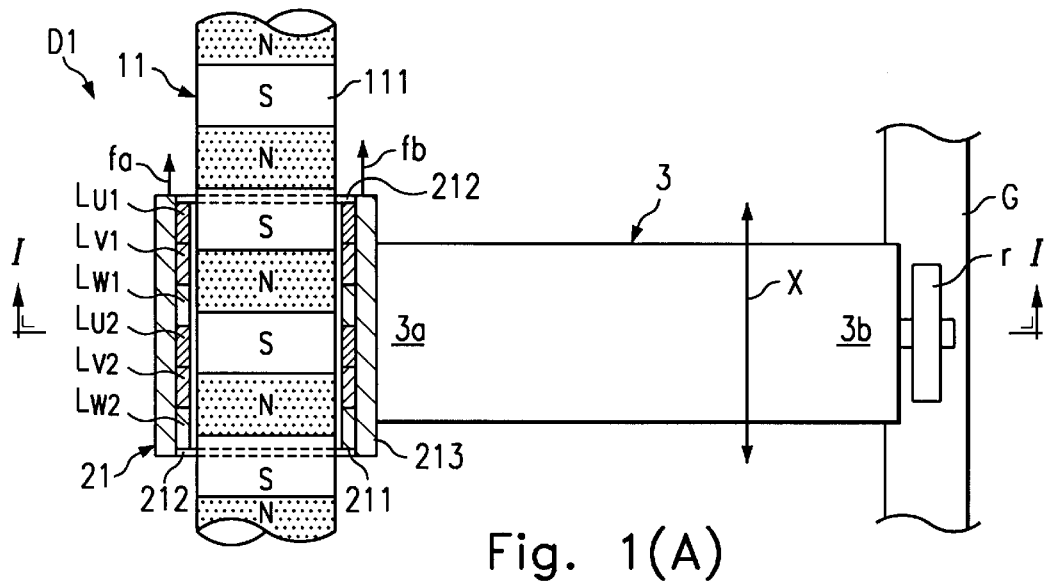
FIG. 1(A) is a schematic plan showing an example of a linear drive device according to the invention with a certain portion shown in a sectional view.

Linear drive devices of the foregoing first to fourth types will be successively described below with reference to the drawings.

(A) Linear Drive Device of the First type

As described before, the linear drive device of the first type is provided for linearly driving a driven object in a predetermined direction perpendicular to a direction of a width of the driven object (the width direction of the driven object), and comprises a shaft extending in the predetermined direction and provided with a field magnet having N- and S-type magnetic poles arranged alternately in the predetermined direction; and a movable piece having an armature coil fitted around the shaft and opposed to the field magnet for generating a thrust in the predetermined direction when energized, being reciprocatable along the shaft, and connected to one end, in the width direction, of the driven object. In this device, thrusts (or propulsion force, driving force) generated by the armature coil at opposite sides, in the width direction of the driven object, of the shaft are determined such that the thrust generated at the side near the driven object is larger than the thrust generated at the side remote from the driven object.

The shaft provided with the field magnet and the movable piece, which has the armature coil opposed to the field magnet and can reciprocate along the shaft, form a so-called shaft-type linear motor. The shaft provided with the field magnet functions as a stator of the linear motor. The shaft serves as a guide member for guiding the movable piece in the predetermined direction.

The movable piece is connected to one of the opposite ends, in the width direction of the driven object, of the driven object. When the armature coil in the movable piece is energized, in other words, when a current is supplied to the armature coil, a thrust or driving force in the predetermined direction is applied to the movable piece owing to an interaction between the current flowing through the armature coil and a magnetic field formed by the field magnet so that the movable piece can be driven in the predetermined direction. Thereby, the driven object connected to the movable piece is driven at its one end to move in the predetermined direction.

The thrust generated by the armature coil and driving the movable piece in the predetermined direction, and more particularly the thrusts which are generated at the opposite sides, in the width direction (i.e., the direction perpendicular to the predetermined direction) of the driven object, of the shaft, are determined such that the thrust generated at the side neighboring to the driven object is larger than the thrust generated at the other side remote from driven object. A difference between these thrusts, which are generated by the armature coil at the opposite sides in the width direction of the driven object, acts as a force for driving the end (free end) of the driven object not connected to the movable piece to precede the other end (driven end) connected to the movable piece. This force acts to cancel a force which acts to retard the free end of the driven object so that a delay in movement or travel of the free end of the driven object can be reduced as compared with the prior art. Owing to this, the driven object can be moved in the travel direction (predetermined direction) while keeping a regular attitude.

The thrusts generated by the armature coil at the opposite sides, in the width direction of the driven object, of the shaft are determined such that the thrust generated at the side near the driven object is larger than the thrust generated at the side remote from the driven object. This relationship can be achieved, for example, by the following manner.

The magnetic fields formed by the field magnet on the section perpendicular to the predetermined direction, and particularly the magnetic fields at the opposite sides, in the width direction of the driven object, of the shaft may form an offset or eccentric magnetic field, and are determined such that the magnetic field at the side near the driven object is larger in intensity than the magnetic field at the side remote from the driven object.

When two driven objects are to be reciprocated in the same predetermined direction, two movable pieces are employed for reciprocation along the common shaft, and one of them, i.e., the first movable piece is connected to the first driven object. The other, i.e., the second movable piece is connected to the second driven object.

The driven object may be a carriage or a slider which is employed in an image reading apparatus for optically scanning and reading, e.g., an original image and is driven in the above predetermined direction together with an optical part carried thereon. In the image reading apparatus, it may be required to reciprocate two sliders in the same predetermined direction.

An embodiment of the linear drive device of the first type will now be described below with reference to the drawings.

Figure 1B:
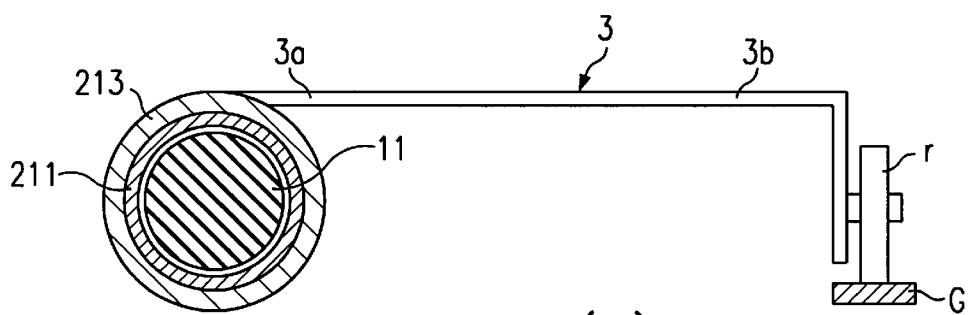
FIG. 1(B) is a schematic cross section of the linear drive device taken along line I—I in FIG. 1(A)

FIG. 1(A) is a schematic plan view showing an example of the linear drive device of the first type with a certain portion shown in a sectional view. FIG. 1(B) is a schematic cross section of the linear drive device taken along line A—A in FIG. 1(A).

This linear drive device D1 is employed for reciprocating a driven object 3 in an X direction perpendicular to the width direction (lateral direction in the figure) of the object 3.

The linear drive device D1 is provided with a shaft 11 extending in the X direction and having a circular section, and a movable piece 21 which is fitted around the shaft 11 for reciprocation along the shaft 11 and is connected to one end 3a, in the width direction, of the driven object 3. For stably driving the driven object 3 in the X direction, the driven object 3 is provided at the other end 3b with a roller r which rolls on a guide rail G arranged in the X direction.

The shaft 11 is made of a machinable and magnetizable material, and has a smooth surface. The shaft 11 has been magnetized to form a field magnet 111 which is provided with N- and S-type magnetic poles arranged alternately in the X direction with an equal pitch P.

Figure 1C:
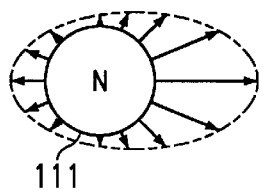
FIG. 1(C) shows an example of a magnetic field formed by a field magnet shown in FIG. 1(A) on a section perpendicular to a travel direction of a driven object.

FIG. 1(C) shows a magnetic field formed by the field magnet 111 on a section perpendicular to the X direction. The field magnet 111 forms an offset or eccentric magnetic field on the section perpendicular to the X direction as described below. In FIG. 1(C), lines with arrows represent magnetic lines of force. FIG. 1(C) shows the magnetic field around the N-pole of the field magnet 111. The magnetic field around the S-pole is similar to that shown in FIG. 1(C) except that the directions of the magnetic field are opposite to those shown in FIG. 1(C).

The magnetic fields formed by the field magnet 111 on the section perpendicular to the X direction and formed at the opposite sides, in the width direction of the driven object 3, of the shaft 11 are determined as follows. The magnetic field at the side near the driven object 3 (i.e., at the right side in FIG. 1(C)) is larger in intensity than the magnetic field at the other side remote from the driven object 3 (i.e., at the left side in FIG. 1(C)). In this embodiment, the magnetic field in the X direction formed by the field magnet 111 has a sinusoidal waveform having a period defined by the N- and S-poles, and provides the offset magnetic field as described above.

The movable piece 21 has a ring-shaped armature coil 211 which is fitted around the shaft 11 provided with the field magnet 111 with a space. In this embodiment, the armature coil 211 is formed of six coils $L_{U1}$, $L_{V1}$, $L_{W1}$, $L_{U2}$, $L_{V2}$ and $L_{W2}$. Each coil has a width (i.e., length in the X direction) equal to ⅔ of the magnetic pole pitch P of the field magnet 111. These coils are shifted by 2P/3 from each other. The armature coil 211 is supported at an inner side by a cylindrical yoke 213 made of a magnetic material. The yoke 213 is provided at its opposite ends in the X direction with bearings 212. The movable piece 21 is guided by the shaft 11 through the bearings 212 for smooth movement. The shaft 11 functions as a guide for linear motion of the movable piece 21.

In this linear drive device D1, the shaft 11 provided with the field magnet 111 and the movable piece 21 having the armature coil 211 form the linear motor of a so-called shaft type. The shaft 11 provided with the field magnet 111 functions also as a stator of the linear motor.

In the linear drive device D1, a thrust (or propulsion force, driving force) in the X direction is generated by energizing the armature coil 211 of the movable piece 21 so that the movable piece 21 is driven along the shaft 11. Thereby, the driven object 3 coupled to the movable piece 21 is driven at its one side so that the driven object 3 moves in the X direction.

Since the field magnet 111 produces the offset magnetic field shown in FIG. 1(C) on the section perpendicular to the X direction, the thrust generated by the armature coil 211 for driving the movable piece 21 in the X direction, and more specifically the thrusts at the opposite sides of the shaft 11 in the width direction of the object 3 have such a relationship that a thrust fb generated at the side near the driven object 3 is larger than a thrust fa generated at the side remote from the driven object 3. This difference (fb−fa) between the thrusts acts as a force, by which the free end 3b in the width direction of the driven object 3 not connected to the movable piece 21 is driven to precede the driven end 3a connected to the movable piece 21 in the advancing direction (parallel to the X direction specifically including this advancing direction and a returning direction). This force, which acts on the free end 3b of the driven object 3 to precede the other end 3a, cancels a force which acts to retard the free end 3b, which can suppress yawing of the driven object 3 which may be caused in the prior art by the force acting to retard the free end of the driven object 3. The force, which acts to retard the free end 3b of the driven object 3, may be produced due to a pulling force acting on the driven end 3a of the driven object 3, a motion resistance at the free end 3b, imbalance in a weight distribution in the width direction of the driven object 3 and other factors. Thereby, the driven object 3 can be driven more precisely with a more stable attitude.

Figure 1D:
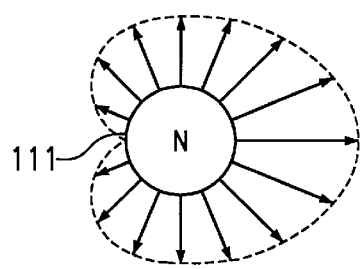
FIG. 1(D) shows another example of a magnetic field formed by the field magnet on a section perpendicular to the travel direction of the driven object.

In the offset magnetic field shown in FIG. 1(C), the specific intensities of the magnetic fields at the left and right sides in the figure can be determined based on the weight balance of the driven object 3 itself and parts carried thereon, the motion resistance at the end 3b, results of experiments and/or other factors. Instead of the offset magnetic field shown in FIG. 1(C), an offset magnetic field shown in FIG. 1(D) may be employed.

An example of an image reading apparatus provided with the linear drive device according to the invention described above will be briefly described below with reference to FIGS. 2(A) and 2(B).

Figure 2A:
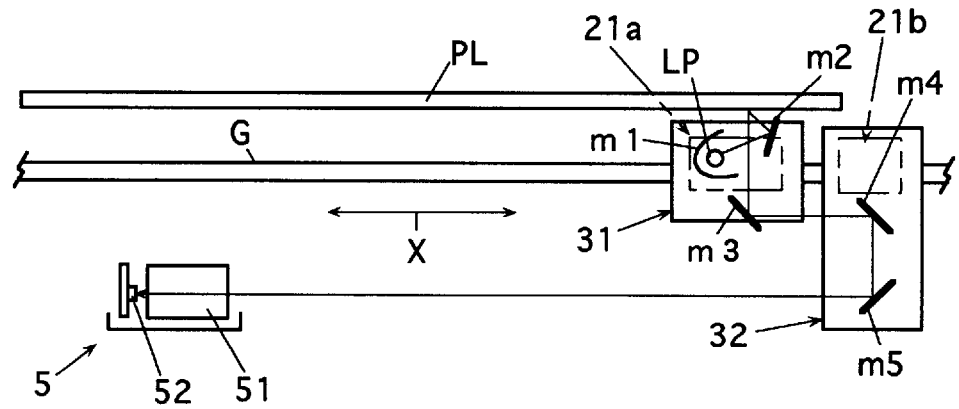
FIG. 2(A) is a schematic side view of an image reading apparatus provided with the linear drive device shown in FIG. 1(A)
Figure 2B:
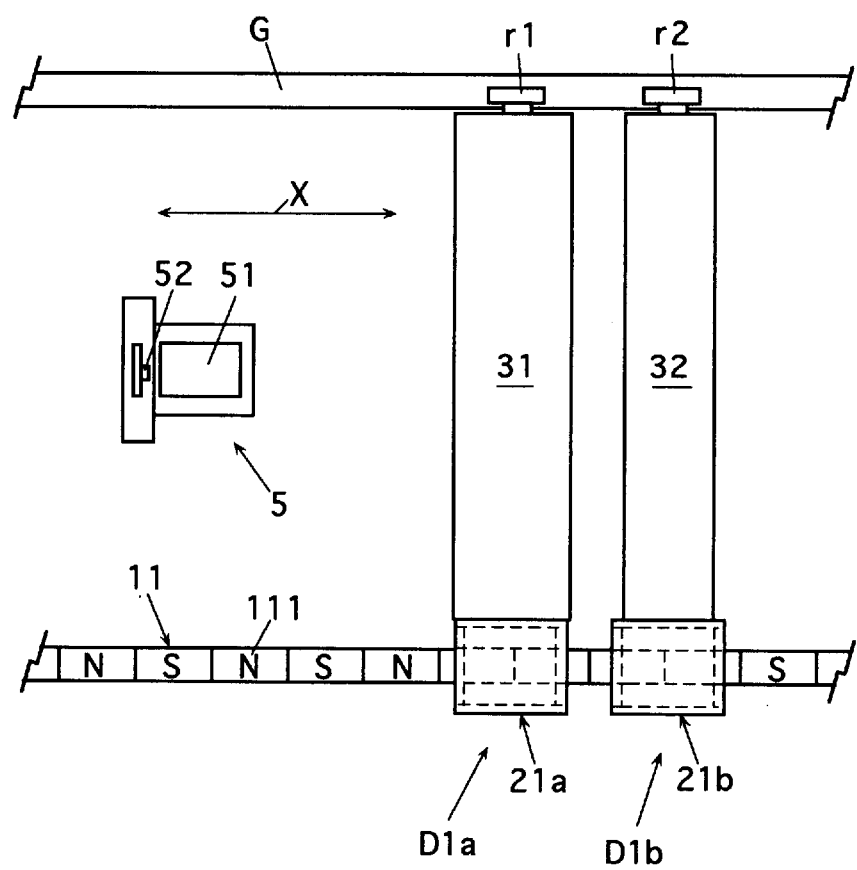
FIG. 2(B) is a schematic plan view of the image reading apparatus.

FIG. 2(A) is a schematic side view of the image reading apparatus, and FIG. 2(B) is a schematic plan view of the image reading apparatus. This image reading apparatus can be utilized in a digital copying machine, an image scanner or the like.

This image reading apparatus employs linear drive devices D1a and D1b according to the invention for driving two carriages (sliders) 31 and 32 carrying optical parts for optical image scanning.

The linear drive devices D1a and D1b are substantially the same as the linear drive device D1 shown in FIG. 1, and include movable pieces 21a and 21b. FIG. 2(A) shows only the movable pieces 21a and 21b with respect to the devices D1a, D1b. Each of the movable pieces 21a and 21b has an armature coil (not shown). These two movable pieces 21a and 21b are fitted around the common shaft 11 provided with the field magnet 111 for reciprocation along the shaft 11. The field magnet 111 forms the offset magnetic field shown in FIG. 1(C). The shaft 11 is arranged along the X direction in which the carriages 31 and 32 are to be driven. The movable piece 21a is connected to one end of the carriage 31, and the movable piece 21b is connected to one end of the carriage 32.

Although not shown, each of the linear drive devices D1a and D1b has a linear encoder for detecting positions in the X direction of the movable pieces 21a and 21b, respectively. The linear encoders are utilized for drive control of the corresponding movable pieces, respectively.

This image reading apparatus is provided with a platen PL made of a flat transparent glass plate. The carriages 31 and 32, and the linear drive devices D1a and D1b are arranged under the platen PL.

The carriage 31 carries an illumination lamp LP for illuminating an original document laid on the platen PL, reflection mirrors m1 and m2 for directing the illumination light beams emitted from the illumination lamp LP toward the original document, and a reflection mirror m3 for leading the light beams reflected by the original document toward the carriage 32. The carriage 31 is provided at its free end with a roller r1 which rolls on a guide rail G arranged parallel to the platen PL and the shaft 11.

The carriage 32 carries reflection mirrors m4 and m5 for leading image light beams led by the reflection mirror m3 toward a read unit 5. The carriage 32 is provided at its free end with a roller r2 which rolls on the guide rail G.

The read unit 5 has a lens 51 and an imaging element, i.e., a CCD 52. The lens 51 focuses the image light beams led by the reflection mirrors m4 and m5 on the carriage 32 onto the CCD 52. This read unit 5 is fixed to the image reading apparatus by an unillustrated support.

When an image of the original document laid on the platen PL is to be read, the lamp LP is turned on, a nd the linear drive devices D1a and D1b drive the carriages 31 and 32 in the same X direction for optically scanning the original document. These carriages 31 and 32 are driven with a speed ratio of 2:1. During this operation, the image light beams reflected by the original document are led to the lens 51 by the mirrors m3, m4 and m5, are focused by the lens 51 onto the CCD 52, and are read by the CCD 52. In this image reading apparatus, each carriage is driven by the linear drive device according to the invention, and therefore yawing of each carriage can be suppressed during driving. Therefore, this image reading apparatus can perform a good image reading operation.

(B) Linear Drive Device of the Second type

The linear drive device of the second type will now be described below.

As already described, the linear drive device of the second type is provided for linearly driving a driven object in a predetermined direction perpendicular to a direction of a width of the driven object, and comprises a guide member extending in the predetermined direction; a movable piece having an armature coil, being reciprocatable along the guide member and connected to one of the ends, in the width of the driven object; a first stator extending linearly in the predetermined direction, having a field magnet provided with N- and S-type magnetic poles arranged alternately in the predetermined direction, and arranged at one of the opposite sides, in the width direction of the driven object, of the guide member neighboring to the driven object; and a second stator extending linearly in the predetermined direction, having a field magnet provided with N- and S-type magnetic poles arranged alternately in the predetermined direction, and arranged at the other side, in the width direction of the driven object, of the guide member remote from the driven object. In this device, a thrust in the predetermined direction generated by energizing the armature coil subjected to a magnetic field formed by the field magnet of the first stator is larger than a thrust in the predetermined direction generated by energizing the armature coil subjected to a magnetic field formed by the field magnet of said second stator.

The movable piece having the armature coil is engaged with the guide member and reciprocatable in the predetermined direction along the guide member. The movable piece is connected to one of the ends, in the width direction of the driven object, i.e., in the direction perpendicular to the predetermined direction, of the driven object.

The first and second stators are arranged at the opposite sides, in the width direction of the driven object, of the guide member in the following manner. The first stator is arranged at one side of the guide member near the driven and the second stator is arranged at the other side. The second stator, the guide member and the first stator are arranged widthwise of the driven object in this order, and the first stator is arranged closer to the driven object than the second stator.

The first stator is provided with a field magnet (first field magnet). The second stator is provided with a field magnet (second field magnet). These first and second field magnets as well as the armature coil in the movable piece form the linear motor.

When the armature coil in the movable piece is energized, a current flowing through the armature coil interacts with the magnetic fields formed by the first and second field magnets to apply the thrusts (drive forces) in a predetermined direction to the movable piece so that the movable piece is driven in the predetermined direction. Thereby, the driven object connected to the movable piece is driven at its one end, and the whole driven object is driven in the predetermined direction.

In this operation, the thrusts generated by energizing the armature coil are determined such that the thrust generated by the magnetic field of the first field magnet is larger than the thrust generated by the field magnet of the second field magnet. In other words, the thrusts generated by the armature coil, which are operable for driving the movable piece in the predetermined direction, and more specifically the thrusts at the opposite sides, in the width direction of the driven object, of the guide member are determined similarly to the linear drive device of the first type, and further more specifically are determined such that the thrust generated at the side near the driven object is larger than the thrust generated at the side remote from the driven object.

As already described, a difference between the thrusts, which are generated by the armature coil at the opposite positions spaced from each other in the width direction of the driven object, acts as a force in the travel direction of the driven object for driving the end (free end) of the driven object not connected to the movable piece to precede the other end (driven end) connected to the movable piece.

The driven object also receives a force which acts to retard the free end in the travel direction.

The force which acts to cause the free end to proceed the other end in the width direction of the driven object, and the above retarding force may be equalized to cancel each other. Thereby, it is possible to suppress the yawing of the driven object, which may occur due to the force acting to retard the free end of the driven object in the prior art. Therefore, the thrust generated at the side of the armature coil near the driven object and the thrust generated at the side of the armature coil remote from the driven object may be determined such that the force acting to cause the free end to proceed the other end in the width direction of the driven object may be equal to the retarding force, whereby the yawing of the driven object can be suppressed.

The following structure may be employed for appropriately producing the thrusts generated by the armature coil at the opposite sides, in the width direction of the driven object, of the guide member and more specifically such that the thrust generated at the side near the driven object is larger than the thrust generated at the other side. The intensities of the magnetic fields formed by the first and second field magnets, which act on the armature coil to generate the thrusts in the predetermined direction, are determined such that the intensity of the magnetic field produced by the first field magnet is larger than the intensity of the magnetic field produced by the second field magnet.

For example, the first and second field magnets may be formed of magnets which produce the magnetic fields of the substantially same intensity. In this case, a distance between the first stator provided with the first field magnet and the armature coil in the movable piece is determined to be shorter than a distance between the second stator provided with the second field magnet and the armature coil in the movable piece. In this case, the first and second stators can be formed of the substantially same stators so that the kinds of components of the linear drive device can be small in number.

For example, the distance between the first stator provided with the first field magnet and the armature coil in the movable piece may be equal to the distance between the second stator provided with the second field magnet and the armature coil in the movable piece. In this case, the intensity of the magnetic field formed by the first field is determined to be larger than the intensity of the magnetic field formed by the second field magnet at each position in the predetermined direction.

The driven object may be a carriage or a slider which is employed in the image reading apparatus for optically scanning and reading, e.g., an original image and is driven in the above predetermined direction together with an optical part carried thereon. In the image reading apparatus, it may be required to reciprocate two sliders in the same predetermined direction. When two driven objects are to be reciprocated in the same predetermined direction, two movable pieces are employed for reciprocation along a guide member, and one of them, i.e., the first movable piece may be connected to the first driven object. The other, i.e., second movable piece may be connected to the second driven object.

Embodiments of the linear drive devices of the second type will now be described below with reference to the drawings.

Figure 3A:
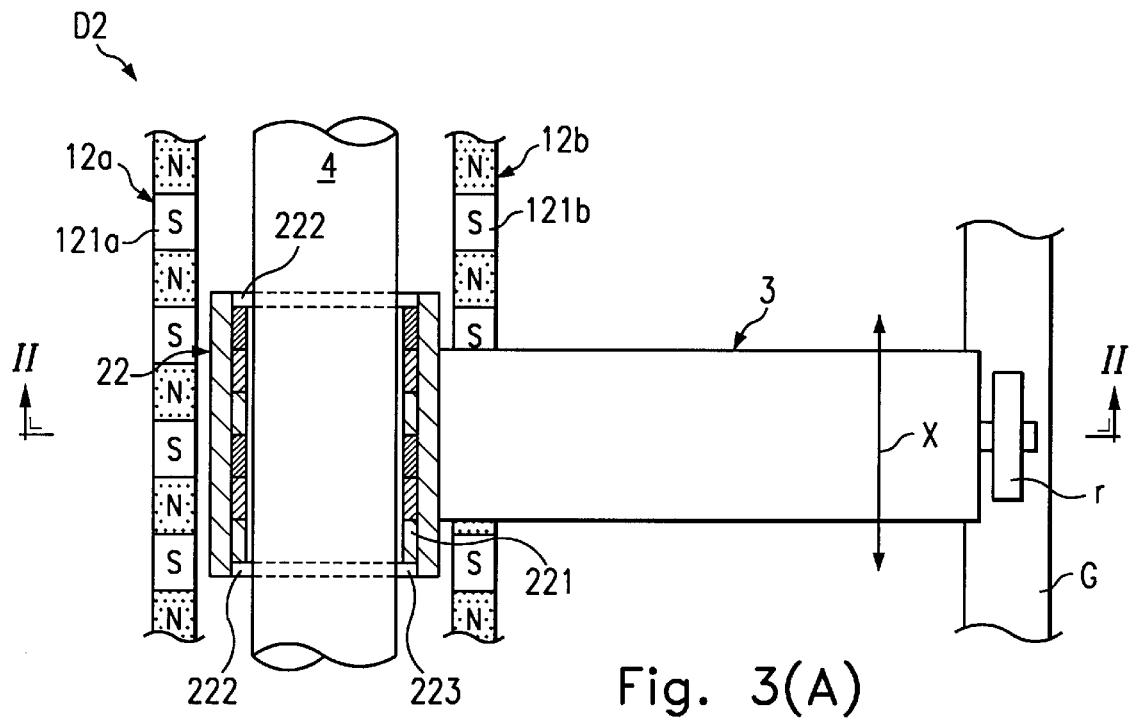
FIG. 3(A) is a schematic plan view showing another example of the linear drive device according to the invention with a certain portion shown in a sectional view.
Figure 3B:
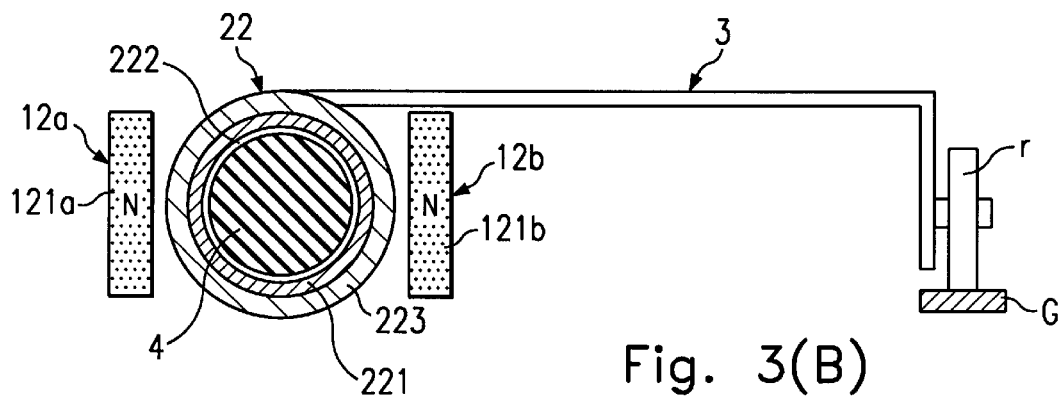
FIG. 3(B) is a schematic cross section of the linear drive device taken along line II—II in FIG. 3(A)

FIG. 3(A) is a schematic plan view showing an example of the linear drive device of the second type with a certain portion shown in a sectional view. Parts having the substantially same functions as those in the linear drive device D1 in FIG. 1(A) bear the same reference numbers and symbols.

The linear drive device D2 is employed to reciprocate the driven object 3 in the X direction. The driven object 3 has a structure similar to that shown in FIG. 1(A).

The linear drive device D2 is provided with a linear motion guide shaft 4 extending in the X direction and having a section, a movable piece 22 reciprocatable along the guide shaft 4 guided by the same, and two flat plate-like stators 12$a$ and 12$b$.

The movable piece 22 has a ring-shaped armature coil 221 fitted around the guide shaft 4. The armature coil 221 is arranged inside a cylindrical movable piece cover 223, and is supported by an inner peripheral surface thereof. The cover 223 is provided at its opposite ends in the X direction with bearings 222 which are slidable on the guide shaft 4. The movable piece 22 is connected to one end in the width direction (lateral direction in the figure) of the driven object 3.

The stators 12$a$ and 12$b$ extend in the X direction, and are arranged at the opposite sides, in the width direction of the driven object 3, of the guide shaft 4 and the movable piece 22. Thus, the stator 12$b$ is arranged at the side neighboring, in the width direction of the driven object 3, to the driven object 3, and the stator 12$a$ is arranged at the side remote from the driven object 3. The distance between the movable piece 22 and the stator 12$a$ is equal to the distance between the movable piece 22 and the stator 12$b$.

These stators 12$a$ and 12$b$ have the substantially same structures except for magnetic flux distributions and sectional areas, as will be described later. The stators 12$a$ and 12$b$ are made of a machinable and magnetizable material, and have smooth surfaces. The stator 12$a$ has been magnetized to form a field magnet 121$a$ which is provided with N- and S-type magnetic poles alternately arranged in the X direction with an equal pitch. Likewise, the stator 12$b$ has been magnetized to form a field magnet 121$b$ which is provided with N- and S-type magnetic poles alternately arranged in the X direction with an equal pitch. These field magnets 121$a$ and 121$b$ are arranged such that N- and S-poles of one of the field magnets are opposed to the N- and S-poles of the other, respectively.

Figure 3C:
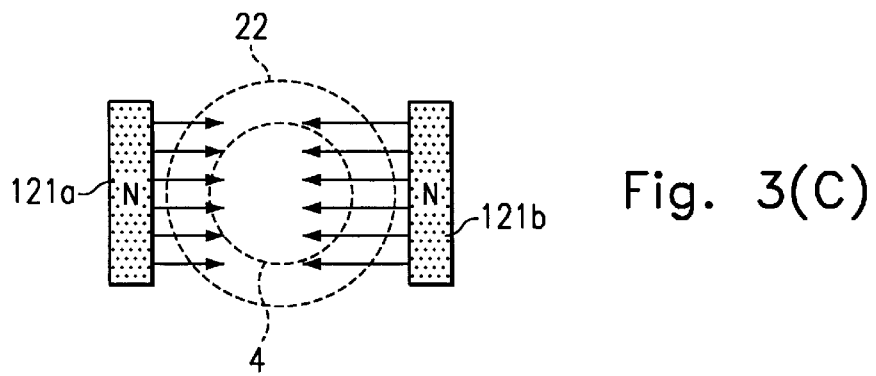
FIG. 3(C) shows magnetic fields formed by field magnets shown in FIG. 3(A) on a section perpendicular to a travel direction of a driven object.

FIG. 3(C) shows magnetic fields formed by the field magnets 121$a$ and 121$b$ on a section perpendicular to the X direction. In FIG. 3(C), lines with arrows represent magnetic lines of force.

The intensity of the magnetic field formed by the field magnet 121$b$, which is arranged at the side of the movable piece 22 near the driven object 3, is larger than that formed by the field magnet 121$a$. The magnetic fields formed in the X direction by the foregoing field magnets have sinusoidal waveforms having the same period defined by the N- and S-poles.

In the linear drive device D2 described above, the magnetic fields acting on the armature coil 221 at the opposite sides, in the width direction of the driven object 3, of the guide shaft 4 have such intensities that the intensity of the magnetic field at the side near the driven object 3 is larger than that at the other side so that the thrusts acting on the armature coil 221 at the opposite sides, in the above width direction, of the guide shaft 4 have such a relationship that the thrust at the side near the driven object 3 is larger than the thrust at the other side. Therefore, the yawing of the driven object 3 can be suppressed similarly to the linear drive device D1 shown in FIG. 1, and therefore the driven object 3 can be driven precisely with a stable attitude.

In the linear drive device D2, the distance between the movable piece 22 and the stator 12$a$, which is arranged at one of the opposite sides of the shaft 4 in the driven object width direction, is set equal to the distance between the movable piece 22 and the stator 12$b$, which is arranged at other side of the shaft 4, and the intensities of the magnet fields produced by the field magnets 121$a$ and 121$b$ are set differently so that the thrusts acting on the armature coil 221 at the opposite sides in the driven object width direction may satisfy the relationship that the thrust generated at the side near the driven object 3 is larger than the thrust generated at the other side.

Figure 4A:
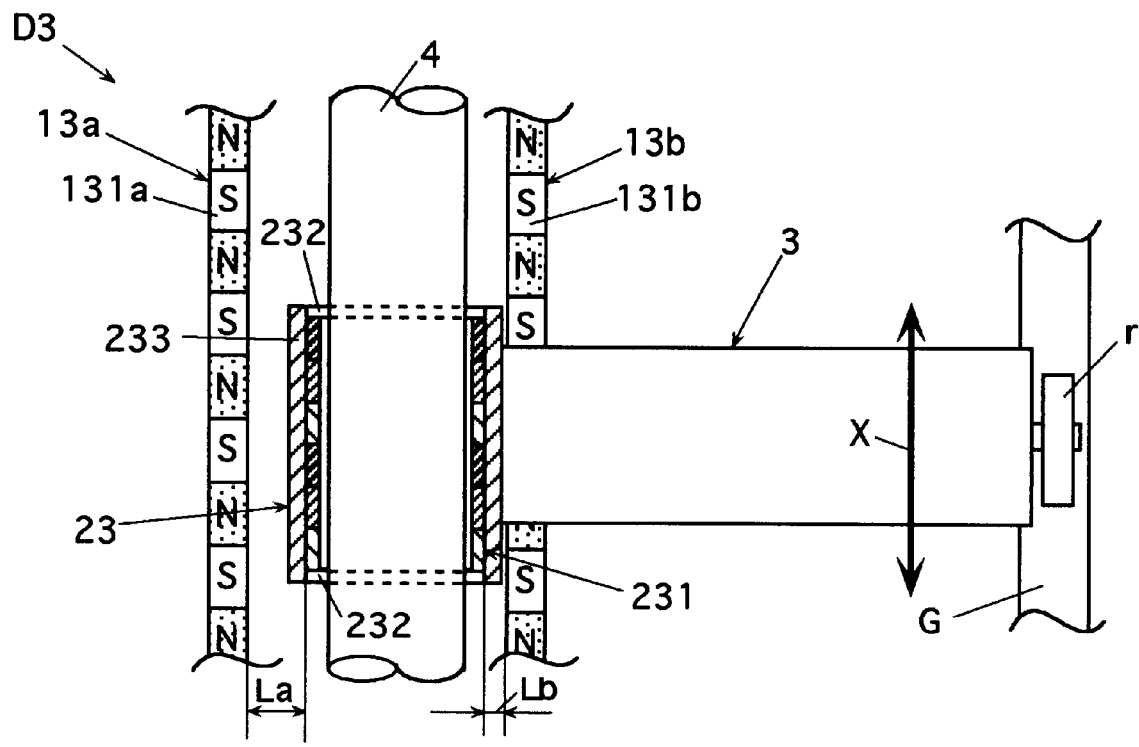
FIG. 4(A) is a schematic plan view showing still another example of the linear drive device according to the invention with a certain portion shown in a sectional view.
Figure 4B:
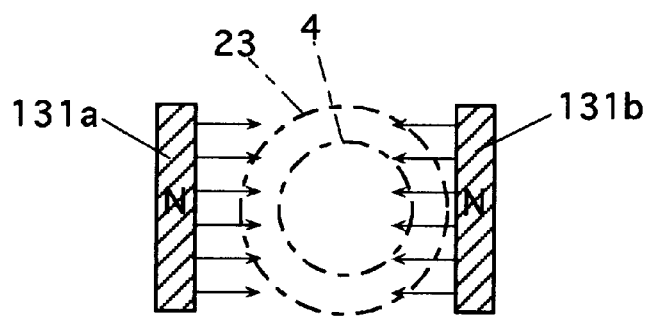
FIG. 4(B) shows magnetic fields formed by field magnets shown in FIG. 4(A) on a section perpendicular to a travel direction of a driven object.

Alternatively, a linear drive device D3 shown in FIGS. 4(A) and 4(B) can also provide the thrusts acting on the movable piece at opposite sides in the driven object width direction which satisfy the above relationship.

FIG. 4(A) is a schematic plan view of the linear drive device D3. The linear drive device D3 is substantially the same as the linear drive device D2 except for the intensities of the magnetic fields which are produced by the field magnets formed at the two stators as well as positions of these stators. Parts having the substantially same functions as the linear drive device D2 bear the same reference numbers and symbols.

In the linear drive device D3, flat plate-like stators 13$a$ and 13$b$ are arranged at opposite sides, in the width direction of the driven object 3, of the movable piece 23. The movable piece 23 can travel along the linear motion shaft 4 guided by the same and has a ring-like armature coil 231 and bearings 232 fitted around the shaft 4 which are supported by a cover 233. The stator 13$b$ is arranged at one of the opposite sides, in the driven object width direction, of the movable piece 23 near the driven object 3, and the stator 13$a$ is arranged at the other side. The stator 13$a$ is provided with a field magnet 131$a$, and the stator 13$b$ is provided with a field magnet 131b. These field magnets 131a and 131b have uniformly magnetized structures providing the same magnetic flux densities as shown in FIG. 4(B). A distance Lb between the stator 13b and the movable piece 23 (armature coil 231) is shorter than a distance La between the stator 13a and the movable piece 23 (armature coil 231). Owing to this, the thrusts applied to the movable piece 23 at the opposite sides, in the driven object width direction, of the guide shaft 4 are determined such that the thrust generated at the side near the connection to the driven object 3 is larger than the thrust generated at the other side. Therefore, the yawing of the driven object 3 can be suppressed.

Figure 5A:
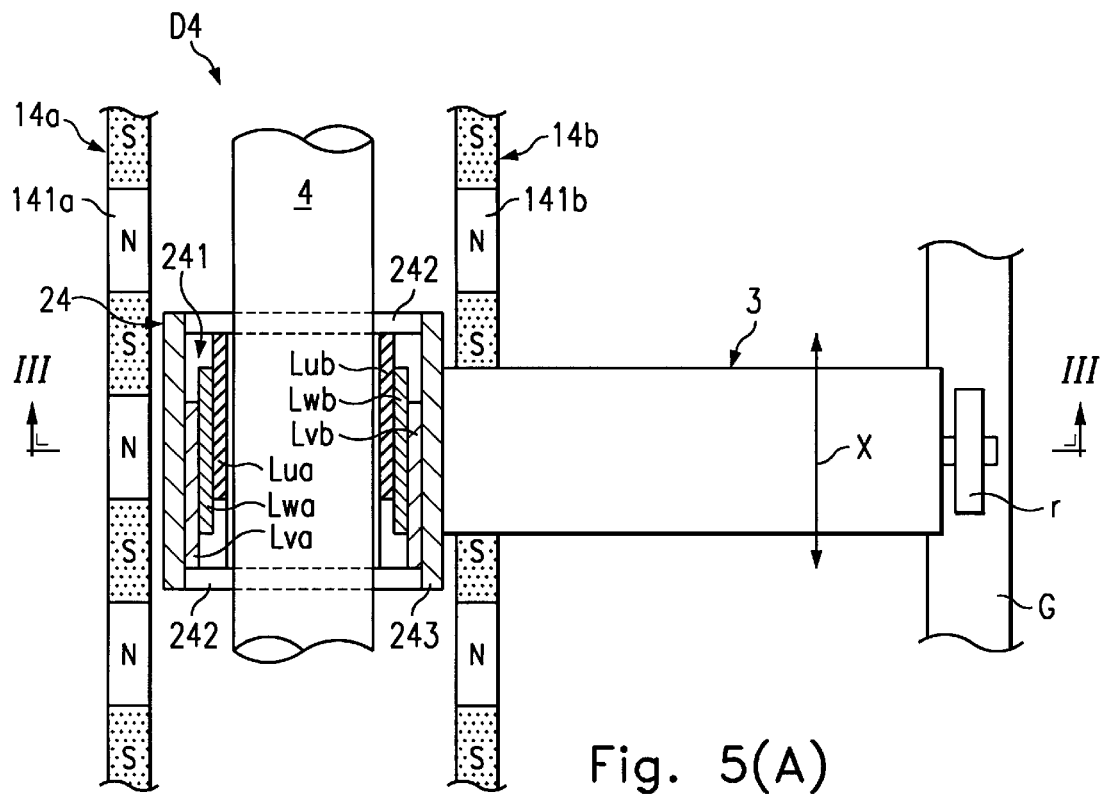
FIG. 5(A) is a schematic plan view showing yet another example of the linear drive device according to the invention with a certain portion shown in a sectional view.
Figure 5B:
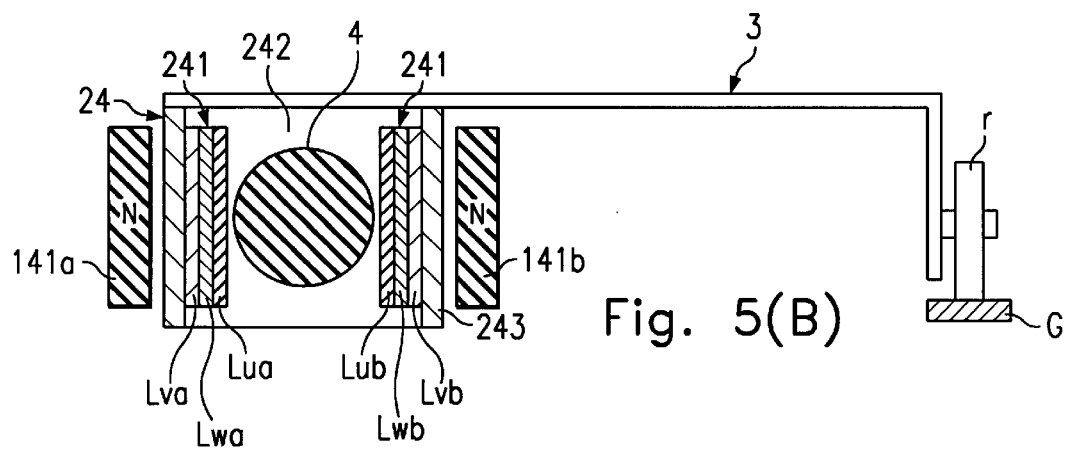
FIG. 5(B) is a schematic cross section of the linear drive device taken along line III—III in FIG. 5(A)

FIG. 5(A) is a schematic plan view showing another example of the linear drive device of the second type with a certain portion shown in a sectional view. FIG. 5(B) is a schematic cross section taken along line C—C in FIG. 5(A).

A linear drive device D4 shown in FIGS. 5(A) and 5(B) is operable to reciprocate the driven object 3 in the X direction. The driven object 3 has a structure similar to that shown in FIG. 1(A).

The linear drive device D4 includes a linear motion guide shaft 4 having a circular section and extending in the X direction, a movable piece 24 which is reciprocatable along the guide shaft 4 guided by the same, and two flat plate-like stators 14a and 14b extending in the X direction. The movable piece 24 is connected to one of the opposite ends in the width direction (lateral direction in the figure) of the driven object 3.

The stators 14a and 14b are arranged at the opposite sides, in the driven object width direction, of the guide shaft 4 and the movable piece 24, respectively. More specifically, the stator 14b is arranged at the side near the driven object 3, and the stator 14a is arranged at the other side. These stators 14a and 14b are arranged such that a distance between the movable piece 24 and the stator 14a is equal to a distance between the movable piece 24 and the stator 14b.

Figure 5C:
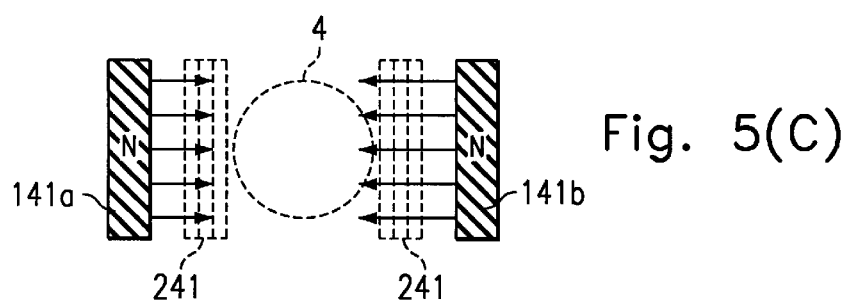
FIG. 5(C) shows magnetic fields formed by field magnets shown in FIG. 5(A) on a section perpendicular to a travel direction of a driven object.

The stator 14a is provided with a field magnet 141a having N- and S-type magnetic poles arranged alternately in the X direction. The stator 14b is provided with a field magnet 141b having a similar structure. Each magnetic field has a magnetic pole pitch of P. FIG. 5(C) shows magnetic fields formed by the field magnets 141a and 141b on a section perpendicular to the X direction. In FIG. 5(C), lines with arrows represent magnetic lines of force.

Similarly to the stators 12a and 12b shown in FIG. 3(A), the magnetic field, which is formed by the field magnet 141b at the side near, in the driven object width direction, to the driven object 3, is larger in intensity than the magnetic field formed by the other field magnet 141a. The magnetic fields in the X direction formed by these field magnets have sinusoidal waveforms of equal periods, each of which is defined by the N- and S-poles, and these field magnets are arranged such that N- and S-poles of one of the field magnets are opposed to the N- and S-poles of the other, respectively.

The movable piece 24 has an armature coil 241, a movable piece cover 243 supporting the armature coil 241 at its inner peripheral surface, and bearings 242 which are arranged at the opposite sides in the X direction of the cover 243 and are slidable along the guide shaft 4.

The armature coil 241 is formed of coils arranged at the opposite sides, in the driven object width direction, of the guide shaft 4, and more specifically are formed of three coils $L_{Ub}$, $L_{Vb}$ and $L_{Wb}$ arranged at the side near the driven object 3 as well as three coils $L_{Ua}$, $L_{Va}$ and $L_{Wa}$ arranged at the side remote from the driven object 3. Each coil takes the form of a rectangular frame-like form, of which the opening surface is parallel to the X direction. The coils $L_{Ua}$, $L_{Wa}$ and $L_{Va}$ are shifted in the X direction from each other by a distance of P/3. Likewise, the coils $L_{Ub}$, $L_{Wb}$ and $L_{Vb}$ are shifted in the X direction from each other by a distance of P/3. The coils $L_{Ua}$ and $L_{Ub}$ are arranged to have their opening surfaces opposed to each other, and the coils $L_{Va}$ and $L_{Vb}$ as well as the coils $L_{Wa}$ and $L_{Wb}$ are arranged in the same manner.

In the foregoing linear drive device D4 shown in FIG. 5(A) to FIG. 5(C), the magnetic fields acting on the armature coil 241 at the opposite sides, in the driven object width direction, of the guide shaft 4 are determined such that the magnetic field at the side near the driven object 3 is larger in intensity than the magnetic field at the other side. Therefore, the thrusts acting on the armature coil 241 at the opposite sides, in the driven object width direction, of the guide shaft 4 are determined such that the thrust generated at the side near the driven object 3 is larger than the thrust generated at the other side. Therefore, the yawing motion of the driven object 3 can be suppressed.

Even in the case, in the linear drive device 4, when the field magnets 141a and 141b at the opposite sides of the movable piece 24 may have uniformly magnetized structures providing the same magnetic flux densities, and a current supplied through the coils $L_{Ub}$, $L_{Wb}$ and $L_{Vb}$ in the movable piece 24 at the side near the driven object may be larger than a current supplied through the coils $L_{Ua}$, $L_{Va}$ and $L_{Wa}$ at the opposite side, the thrusts acting on the armature coil 241 at the opposite sides, in the driven object width direction, of the guide shaft 4 can be determined such that the thrust generated at the side near the driven object 3 is larger than the thrust generated at the other side.

In the linear drive device D4, the distance between the movable piece 24 and the stator 14a, which is arranged at one of the opposite sides of the shaft 4 in the driven object width direction, is set equal to the distance between the movable piece 24 and the stator 14b, which is arranged at other side of the shaft 4, and the intensities of the magnet fields produced by the field magnets 141a and 141b are set differently so that the thrusts acting on the armature coil 241 at the opposite sides in the driven object width direction may satisfy the relationship that the thrust generated at the side near the driven object 3 is larger than the thrust generated at the other side. Alternatively, a linear drive device D5 shown in FIG. 6(A) can also provide the thrusts acting on the movable piece at opposite sides in the driven object width direction which satisfy the above relationship.

Figure 6A:
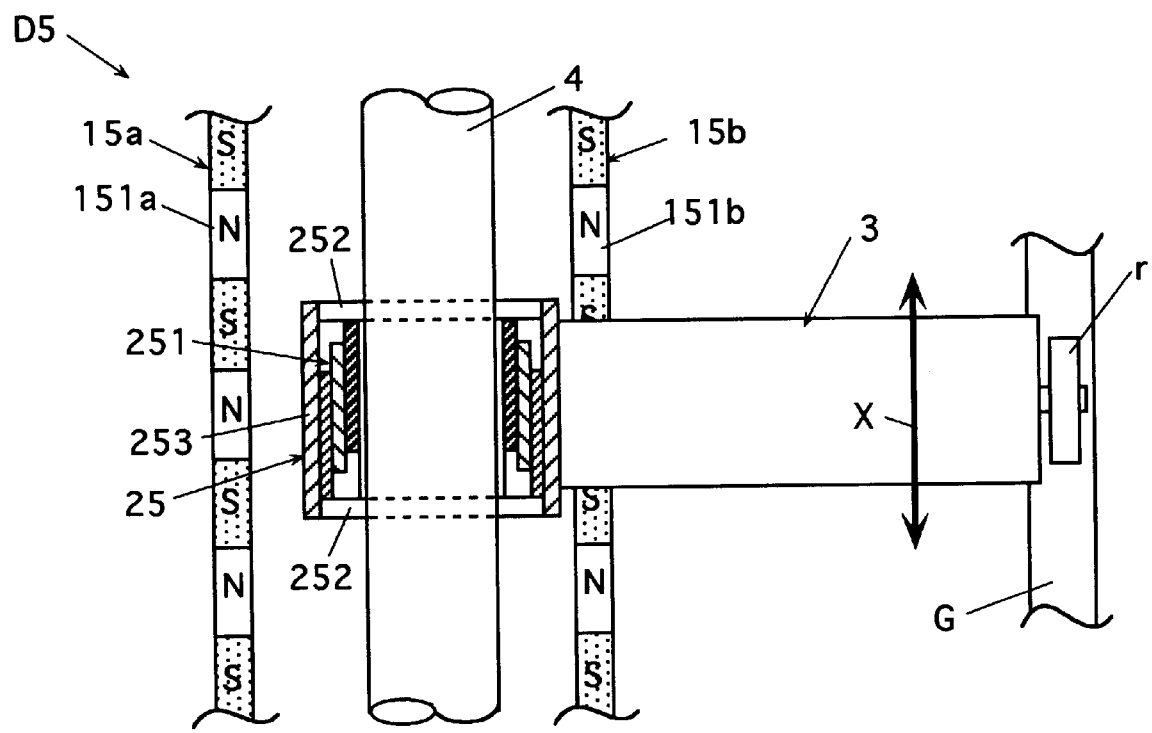
FIG. 6(A) is a schematic plan view showing further another example of the linear drive device according to the invention with a certain portion shown in a sectional view.

FIG. 6(A) is a schematic plan view of the linear drive device D5. The linear drive device D5 is substantially the same as the linear drive device D4 except for the intensities of the magnetic fields produced by the field magnets formed on the two stators as well as the positions of these stators. Parts having the substantially same functions as those in the linear drive device D4 bear the same reference numbers and symbols.

Figure 6B:
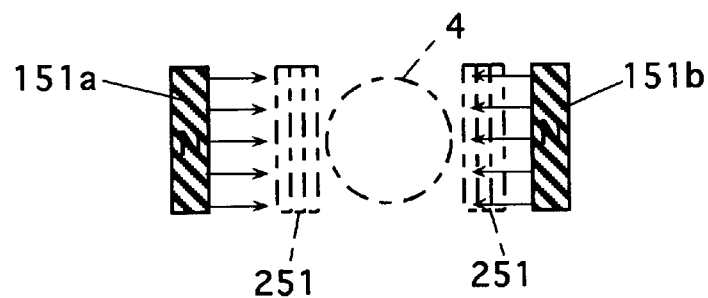
FIG. 6(B) shows magnetic fields formed by field magnets shown in FIG. 6(A) on a section perpendicular to a travel direction of a driven object.

The linear drive device D5 has a movable piece 25 and flat plate-like stators 15a and 15b arranged at the opposite sides, in the width direction of the driven object 3, of the movable piece 25. The movable piece 25 can move along the linear motion guide shaft 4 and has an armature coil 251 formed of six coils similar to those of the armature coil 241. The movable piece 25 also has bearings 252 fitted around the shaft 4 and a cover 253 holding the coil 251 and bearings 252. The stator 15b is arranged at the side of the guide shaft 4 near the driven object 3, and the stator 15a is arranged at the other side. The stator 15a is provided with a field magnet 151a, and the stator 15b is provided with a field magnet 151b. These field magnets 151a and 151b have uniformly magnetized structures providing the same magnetic flux densities as shown in FIG. 6(B). A distance between the stator 15b and the movable piece 25 (armature coil 251) is shorter than a distance between the stator 15a and the movable piece 25 (armature coil 251). Owing to this, the thrusts applied to the movable piece 25 at the opposite sides, in the driven object width direction, of the guide shaft 4 are determined such that the thrust generated at the side near the driven object 3 is larger than the thrust generated at the other side. Therefore, when the driven object 3 is driven by the linear drive device D5, the yawing of the driven object 3 can be suppressed.

The linear drive devices D2, D3, D4 and D5 of the second type described above can likewise be used for driving the carriages 31 and 32 of the image reading apparatus shown in FIG. 2.

(C) Linear Drive Devices of the Third and Fourth types

The linear drive devices of the third and fourth types will now be described below.

As described before, the linear drive device of the third type comprises a guide member extending linearly in a predetermined direction; a movable piece engaged with the guide member and reciprocatable in the predetermined direction along the guide member; and a sensor arranged on the movable piece for reading information on the guide member. In this device, the sensor arranged on the movable piece is located substantially at a center of a yawing motion of the movable piece occurring when the movable piece is moving or traveling the guide member.

As also described before, the linear drive device of the fourth type comprises a guide member extending linearly in a predetermined direction; a movable piece engaged with the guide member and reciprocatable in the predetermined direction along the guide member; and a sensor arranged on the movable piece for reading information on the guide member. In this device, the sensor arranged on the movable piece is located substantially at a center of a pitching motion of the movable piece occurring when the movable piece is moving or traveling along the guide member.

In either of the linear drive devices of the third and fourth types, the sensor on the movable piece is provided for reading the information on the guide member. The information is, for example, encoder information or information indicating a predetermined position, e.g. a home position, in the predetermined direction.

For reading encoder information with the sensor, the guide member is provided with an encoder chart (encoder scale) extending in the predetermined direction. The encoder chart and the sensor form the encoder. When the encoder is of an optical type, the encoder chart may be formed of two kinds of surfaces which have, for example, different light reflectances and are arranged alternately in the predetermined direction. In this case, a photosensor can be employed as the sensor. When the encoder is of a magnetic type, the encoder chart may be formed of N- and S-type magnetic poles arranged alternately in the predetermined direction. In this case, a magnetic utilizing a magnetic resistance element or a Hall element can be employed.

The linear drive devices of the third and fourth types may be provided with optical encoders, in which case these linear drive devices have the following structures.

The linear drive device of the third type provided with the optical encoder comprises a guide member extending linearly in a predetermined direction and having an optical encoder chart extending in the predetermined direction; a movable piece engaged with the guide member and reciprocatable in the predetermined direction along the guide member; and a sensor arranged on the movable piece for reading information held on the optical encoder chart. In this device, the sensor arranged on the movable piece is located substantially at a center of a yawing motion of the movable piece occurring during travel of the movable piece along the guide member.

The linear drive device of the fourth type provided with the optical encoder comprises a guide member extending in a predetermined direction and having an optical encoder chart extending linearly in the predetermined direction; a movable piece engaged with the guide member and reciprocatable in the predetermined direction along the guide member; and a sensor arranged on the movable piece for reading information held on the optical encoder chart. In this device, the sensor arranged on the movable piece is located substantially at a center of a pitching motion of the movable piece occurring during travel of the movable piece along the guide member.

In the linear drive device of the third type, the sensor is arranged on the movable piece and more specifically is located substantially at the center of the yawing motion of the movable piece caused during movement of the movable piece along the guide member. Thereby, even when the movable piece yaws during travel in the predetermined direction, the sensor can keep the substantially constant gap and positional relationship with respect to a sensing target object such as an encoder chart arranged on the guide member and bearing information to be read by the sensor. Even when the movable piece yaws to a large extent, it is possible to prevent the sensor from deviating from the position opposed to the sensing target object. As a result, the sensor can stably read the information such as encoder chart information.

In the linear drive device of the fourth type, the sensor is arranged on the movable piece and more specifically is located substantially at the center of the pitching motion of the movable piece caused during movement of the movable piece along the guide member. Similarly to the linear drive device of the third type, therefore, even when the movable piece pitches during travel in the predetermined direction, the sensor can keep the substantially constant gap and positional relationship with respect to a sensing target object such as an encoder chart arranged on the guide member and bearing information to be read by the sensor. Even when the movable piece pitches to a large extent, it is possible to prevent the sensor from deviating from the position opposed to the sensing target object. As a result, the sensor can stably read the information such as encoder chart information.

In either of the linear drive devices of the third and fourth types, when the movable piece is connected to a driven object extending in the direction perpendicular to the predetermined direction, and the movable piece is driven in the predetermined direction, the driven object can be driven linearly in the predetermined direction.

The movable piece can be driven in the predetermined direction, for example, by employing the following structure.

For example, the guide member is provided with a field magnet provided with N- and S-type magnetic poles which are arranged alternately in the predetermined direction, and the movable piece is provided with an armature coil which is opposed to the field magnet and generates a thrust (or propulsion force, driving force) in the predetermined direction when energized. These field magnet and armature coil form the linear motor, in which the movable piece itself can generate the thrust.

Alternatively, when a driving force of a rotary motor or the like arranged outside the movable piece is transmitted through a drive force transmitting mechanism formed of a wire, pulleys or the like to the movable piece, the movable piece can be driven in the predetermined direction.

The driven object may be a slider which is employed and arranged in an image reading apparatus for optically scanning and reading an original image, and is driven in the predetermined direction together with an optical part carried thereon.

Embodiments of the linear drive devices of the third and fourth types will now be described below with reference to the drawings.

Figure 7A:
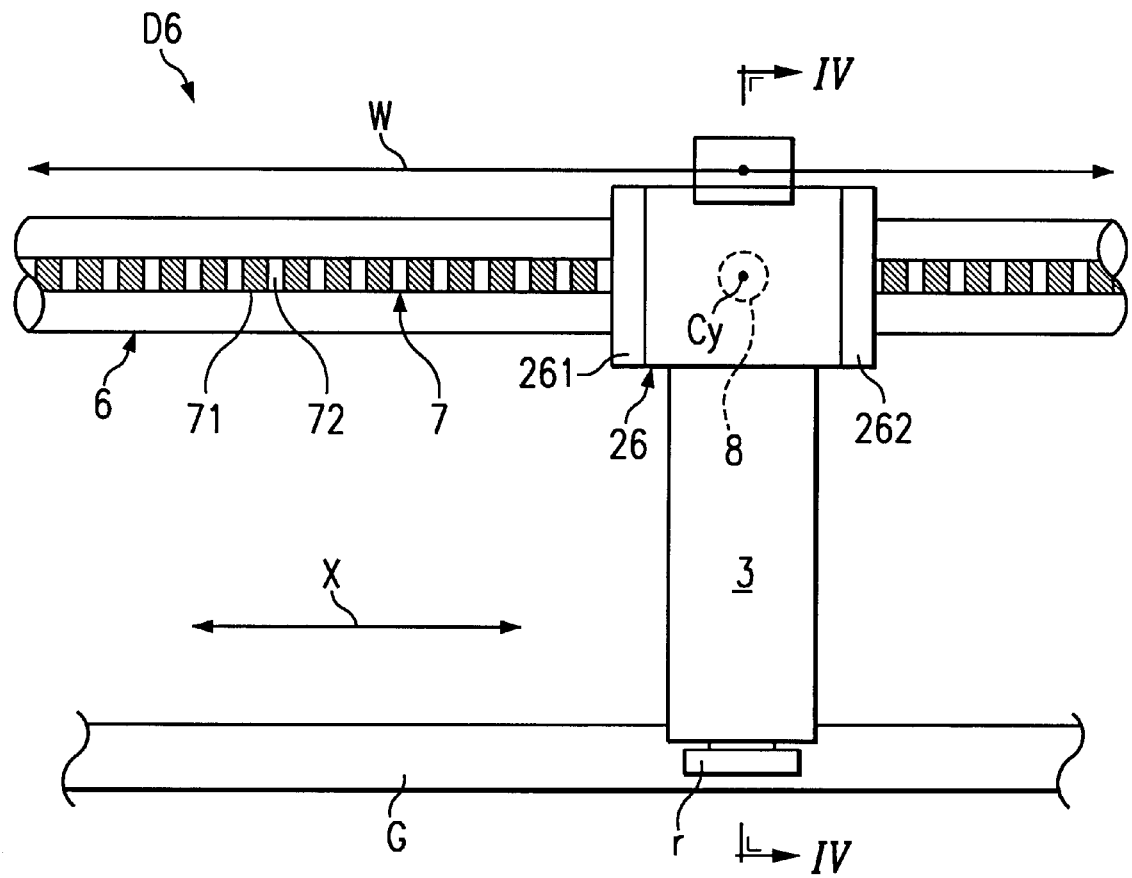
FIG. 7(A) is a schematic plan view showing a further example of the linear drive device according to the invention.
Figure 7B:
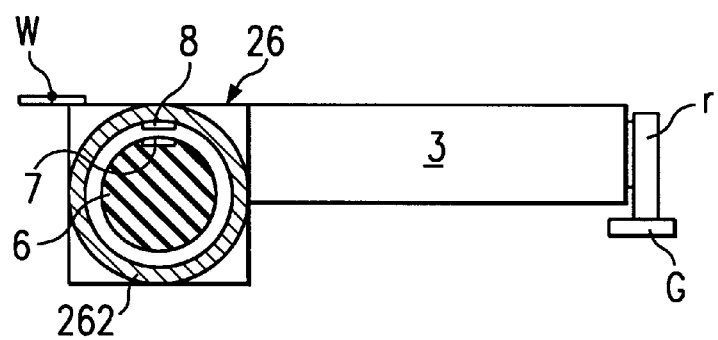
FIG. 7(B) is a schematic cross section of the linear drive device taken along line IV—IV in FIG. 7(A)

FIG. 7(A) is a schematic plan view showing an example of the linear drive device of the third type. FIG. 7(B) is a schematic cross section taken along line D—D in FIG. 7(A).

A linear drive device D6 shown in FIGS. 7(A) and 7(B) is operable to reciprocate the driven object 3 in the X direction. The driven object 3 has a structure similar to that shown in FIG. 1(A).

The linear drive device D6 includes a guide shaft 6 having a circular section and extending in the X direction, and a movable piece 26 fitted around the guide shaft 6 and reciprocatable along the same. The movable piece 26 is connected to one of the opposite ends, in the width direction of the driven object 3 (longitudinal direction in the figure), of the driven object 3.

The guide shaft 6 is provided with an encoder chart (encoder scale) 7 extending in the X direction. The chart 7 is formed of two kinds of portions having different light reflectances, i.e., low reflectance portions 71 and high reflectance portions 72 which are arranged alternately in the X direction with a predetermined pitch.

The movable piece 26 is provided at its opposite ends in the X direction with bearings 261 and 262 slidably fitted around the guide shaft 6. A photosensor 8 for reading encoder information held by the encoder chart 7 is arranged at the position on the movable piece 26 opposed to the encoder chart 7. The sensor 8 has a light emitting element and a light element, and can operate in such a manner that the light receiving element detects light beams emitted from the light emitting element and reflected by the low or high reflectance portion 71 or 72 of the chart 7. The encoder information read by the sensor 8 can be utilized for detecting the position and speed of the movable piece 26 as well as controlling driving of the movable piece 26. The sensor 8 is located at a center Cy of the yawing motion of the movable piece 26 which may occur during movement of the movable piece 26 along the guide shaft 6.

A wire W is connected to the movable piece 26 for transmitting thereto a driving force from a rotary motor (not shown). When the rotary motor operates, the movable piece 26 can be driven along the guide shaft 6 to move the driven object 3 in the X direction.

In the linear drive device D6, since the sensor 8 for detecting the encoder information held by the encoder chart 7 is arranged at the center Cy of the yawing motion of the movable piece 26, a constant distance and a constant positional relationship can be kept between the sensor 8 and the encoder chart 7 even when the movable piece 26 yaws. It is also possible to prevent the sensor 8 from deviating from the position opposed to the encoder chart 7 even when the movable piece 26 yaws to a large extent. These can be achieved during both the forward and rearward movement of the reciprocating movable piece 26 along the guide shaft 6. Therefore, the sensor 8 can stably read the encoder information. Thereby, the movable piece 26 can be driven precisely when the driving of the movable piece 26 is controlled based on the encoder information read by the sensor 8.

In this embodiment, the encoder is of the optical type. Alternatively, it may be of a magnetic type. In the case the sensor of the magnetic type is employed, the encoder chart may be formed of N- and S-type magnetic poles arranged alternately in the X direction with a predetermined pitch, and the sensor may be a magnetic sensor utilizing a magnetic resistance element (MR element) or a Hall element.

Although not shown, the sensor 8 in the linear drive device D6 may be located substantially at the center of the pitching motion of the movable piece 26, whereby the sensor can stably read the encoder information even when the movable piece 26 pitches.

Figure 8A:
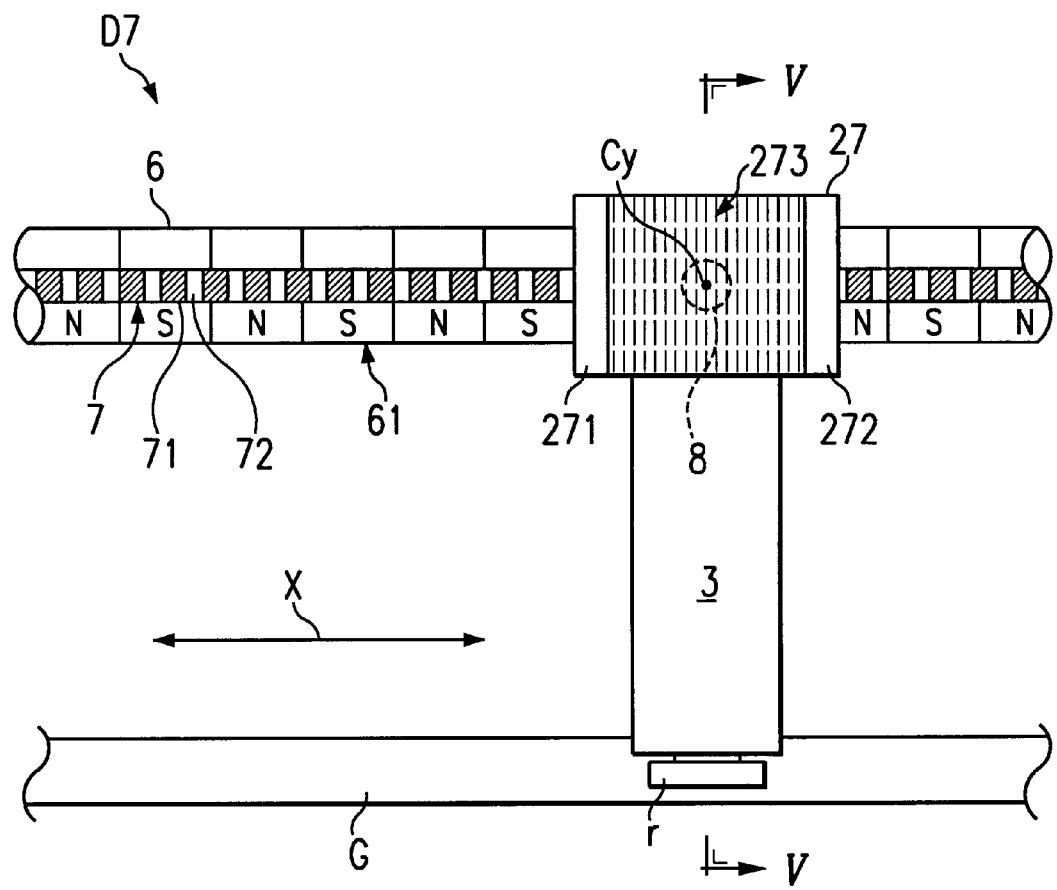
FIG. 8(A) is a schematic plan view showing a further example of the linear drive device according to the invention.
Figure 8B:
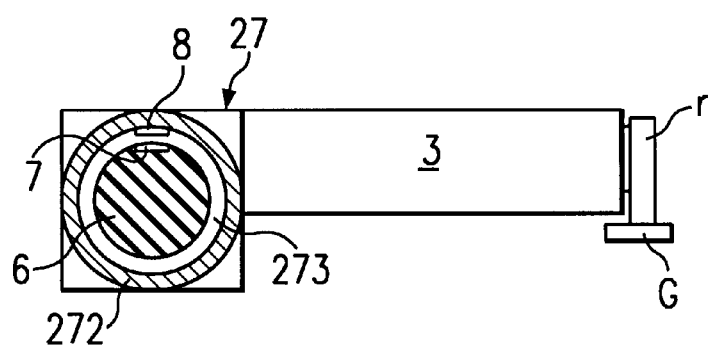
FIG. 8(B) is a schematic cross section of the linear drive device taken along line V—V in FIG. 8(A)
Figure 13:
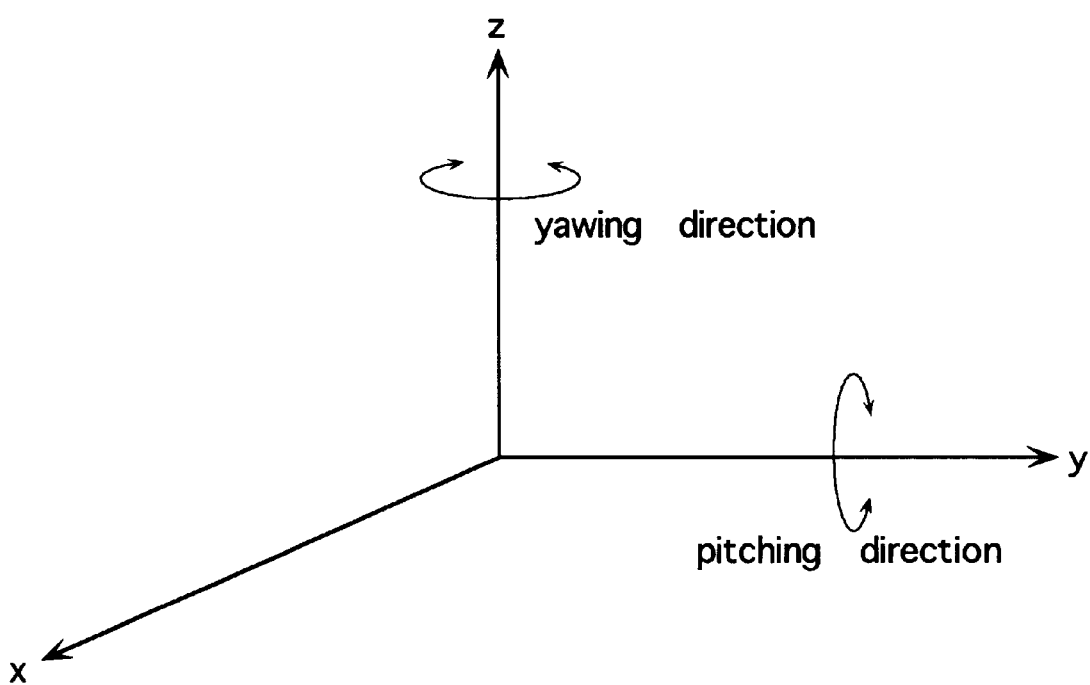
FIG. 13 shows directions of yawing and pitching during travel of the movable piece.

FIG. 8(A) is a schematic plan view of another example of the linear drive device of the third type. FIG. 8(B) is a schematic cross section of the linear drive device taken along line E—E in FIG. 8(A). Parts having the substantially same functions as those in the linear drive device D6 bear the same reference numbers and symbols.

A linear drive device D7 shown in FIGS. 8(A) and 8(B) is operable to reciprocate the driven object 3 in the X direction. The driven object 3 has a structure similar to that shown in FIG. 1(A).

The linear drive device D7 includes the guide shaft 6 having a circular section and extending in the X direction, and a movable piece 27 fitted around the guide shaft 6 and reciprocatable along the same. The movable piece 27 is connected to one of the opposite ends, in the width direction of the driven object 3 (longitudinal direction in the figure), of the driven object 3.

The guide shaft 6 is provided with a field magnet 61 formed of N- and S-type magnetic poles which are arranged alternately in the X direction. The guide shaft 6 is also provided with the optical encoder chart 7.

The movable piece 27 is provided at its opposite ends in the X direction with bearings 271 and 272 slidably fitted around the guide shaft 6. The movable piece 27 has an armature coil 273 fitted around the guide shaft 6 and opposed to the field magnet 61. The photosensor 8 for reading encoder information held by the encoder chart 7 is arranged at the position on the movable piece 27 opposed to the encoder chart 7, and more specifically is located at a center Cy of the yawing motion of the movable piece 27 which may occur during movement of the movable piece 27 along the guide shaft 6.

In the linear drive device D7, the movable piece 27 can be moved in the X direction along the guide shaft 6 when the armature coil 273 is energized. In the linear drive device D7, the direction of movement of the movable piece 27 is coincident with the direction of the generated driving force. Therefore, the movable piece 27 of the linear drive device D7 can be driven more stably than that of the linear drive device D6. Further, the device D7 does not require the driving force transmitting mechanism which is required in the linear drive device D6, and therefore can have a compact structure.

In this linear drive device D7, the sensor 8 is likewise at the center Cy of the yawing motion of the movable piece 27, therefore, the sensor 8 can stably read the encoder information. Thereby, the movable piece 27 can be driven precisely when the driving of the movable piece 27 is controlled based on the encoder information read by the sensor 8.

Although not shown, the linear drive device D7 may have such a structure that the sensor 8 is arranged substantially at the center of the pitching motion of the movable piece 27, in which case the sensor 8 can stably read the encoder information even when the movable piece 27 pitches.

The linear drive devices of the first and second types as well as the linear drive devices of the third and fourth types described above may be combined together.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear drive device for linearly driving a driven object in a predetermined direction perpendicular to a direction of a width of said driven object, comprising:

a shaft extending in said predetermined direction and provided with a field magnet having N- and S-type magnetic poles arranged alternatively in said predetermined direction;

a moveable piece having an armature coil fitted around said shaft and opposed to said field magnet for generating a thrust in said predetermined direction when energized, being reciprocatable along said shaft, and connected to one end, in the width direction, of said driven object, and means for eneraizing said armature coil, wherein thrusts generated by said armature coil at opposite sides, in the width direction of said driven object, of said shaft are determined such that the thrust generated at the side near said driven object is sufficiently larger than the thrust generated at the side remote from said driven object to ensure linear driving of the driven object in the predetermined direction.

2. The linear drive device according to claim 1, wherein magnetic fields formed by said field magnet on a section perpendicular to said predetermined direction and formed at the opposite sides, in the width direction of said driven object, of said shaft form an offset magnetic field and are determined such that the magnetic field at the side near said driven object is larger in intensity than the magnetic field at the side remote from said driven object.

3. The linear drive device according to claim 1, wherein said object driven and said movable piece are two in number, respectively, and the first and second driven objects forming said two driven objects are connected to the first and second movable pieces forming said two movable pieces, respectively.

4. The linear drive device according to claim 1, wherein said driven object is a slider employed in an image reading apparatus for optically scanning and reading an original image and being driven in said predetermined direction together with an optical part carried thereon.

5. The linear drive device of claim 1 wherein the field magnet has a pole pitch P, the armature coil having a plurality of coils, each coil having a length in the predetermined direction of 2P/3.

6. The linear drive device of claim 5 wherein the armature coil has six coils.

7. The linear drive device of claim 1 further comprising:

a sensor arranged on said movable piece for reading information on said shaft wherein said sensor is arranged on said movable piece located substantially at a center of yawing motion of said movable piece occurring during travel of said movable piece along said shaft.

8. The linear drive device of claim 7 wherein the shaft has an optical encoder chart mounted thereon extending linearly in said predetermined direction, said sensor arranged on said movable piece for reading information held on said optical encoder chart.

9. The linear drive device of claim 1 further comprising a sensor arranged on said movable piece for reading information on said shaft wherein said sensor is arranged on said movable piece substantially at a center of pitching motion of said movable piece during travel of said movable piece along said shaft.

10. The linear device of claim 9 wherein said shaft contains said information for reading by the sensor on an optical encoder chart.

11. A linear drive device for linearly driving a driven object in a predetermined direction perpendicular to a direction of a width of said driven object, comprising:

a guide member extending in said predetermined direction;

a moveable piece having an armature coil, being reciprocatable along said guide member and connected to an end, in the width direction, of said driven object;

a first stator extending linearly in said pre-determined direction, having a field magnet provided with N-and S-type magnetic poles arranged alternately in said predetermined direction, and arranged at one of the opposite sides, in the width direction of said driven object, of said guide member neighboring to said driven object; and a second stator extending linearly in said predetermined direction, having a field magnet provided with N- and S-type magnetic poles arranged alternately in said predetermined direction, and arranged at the other side, in the width direction of said driven object, of said guide member remote from said driven object, wherein a thrust in said predetermined direction generated by energizing said armature coil subjected to a magnetic field formed by said field magnet of said first stator is sufficiently larger than a thrust in said predetermined direction generated by energizing said armature coil subjected to a magnetic field formed by said field magnet of said second stator to ensure linear driving of the driven object in the predetermined direction.

12. The linear drive device according to claim 11, wherein intensity of the magnetic field formed by said field magnet of said first stator is larger than intensity of the magnetic field formed by said field magnet of said second stator at each position in said predetermined direction.

13. The linear drive device according to claim 11, wherein a distance between said first stator and said movable piece is shorter than a distance between said second stator and said movable piece.

14. The linear drive device according to claim 11, wherein said driven object is a slider employed in an image reading apparatus for optically scanning and reading an original image and being driven in said predetermined direction together with an optical part carried thereon.

15. The linear drive device of claim 11 wherein said armature coil is formed of a plurality of coils, a first of said coils being on the side adjacent the first stator and a second coil on the side adjacent the second stator, current provided to said first coil being greater than current provided to said second coil.

16. The linear drive device of claim 15 wherein said armature coil includes three first coils and three second coils, the magnetic poles of the first stator and second stator having a magnetic pitch of P, the first coils being shifted relative to each other a distance of P/3 and the second coils being shifted relative to each other a distance P/3 along said predetermined direction.

17. A linear drive device comprising:

a guide member extending linearly in a predetermined direction;

a movable piece engaged with said guide member for reciprocation in said predetermined direction along said guide member; and a sensor arranged on said movable piece for reading information on said guide member, wherein said sensor arranged on said movable piece is located substantially at a center of a yawing motion of said movable piece occurring during travel of said movable piece along said guide member.

18. The linear drive device according to claim 17, wherein said movable piece is connected to a driven object extending in a direction perpendicular to said predetermined direction.

19. The linear drive device according to claim 18, wherein said driven object is a slider employed in an image reading apparatus for optically scanning and reading an original image and being driven in said predetermined direction together with an optical part carried thereon.

20. A linear drive device comprising:

a guide member extending in a predetermined direction and having an optical encoder chart extending linearly in said predetermined direction;

a movable piece engaged with said guide member for reciprocation in said predetermined direction along said guide member; and a sensor arranged on said movable piece for reading information held on said optical encoder chart, wherein said sensor arranged on said movable piece is located substantially at a center of a yawing motion of said movable piece occurring during travel of said movable piece along said guide member.

21. The linear drive device according to claim 20, wherein said guide member has a field magnet having N- and S-type magnetic poles arranged alternately in said predetermined direction, and said movable piece has an armature coil opposed to said field magnet for generating a thrust in said predetermined direction when energized.

22. The linear drive device according to claim 20, wherein said movable piece is connected to a driven object extending in a direction perpendicular to said predetermined direction.

23. The linear drive device according to claim 22, wherein said driven object is a slider employed in an image reading apparatus for optically scanning and reading an original image and being driven in said predetermined direction together with an optical part carried thereon.

24. A linear drive device comprising:

a guide member extending linearly in a predetermined direction;

a movable piece engaged with said guide member for reciprocation in said predetermined direction along said guide member; and a sensor arranged on said movable piece for reading information on said guide member, wherein said sensor arranged on said movable piece is located substantially at a center of a pitching motion of said movable piece occurring during travel of said movable piece along said guide member.

25. The linear drive device according to claim 24, wherein said movable piece is connected to a driven object extending in a direction perpendicular to said predetermined direction.

26. The linear drive device according to claim 25, wherein said driven object is a slider employed in an image reading apparatus for optically scanning and reading an original image and being driven in said predetermined direction together with an optical part carried thereon.

27. A linear drive device comprising:

a guide member extending in a predetermined direction and having an optical encoder chart extending linearly in said predetermined direction;

a movable piece engaged with said guide member for reciprocation in said predetermined direction along said guide member; and a sensor arranged on said movable piece for reading information held on said optical encoder chart, wherein said sensor arranged on said movable piece is located substantially at a center of a pitching motion of said movable piece occurring during travel of said movable piece along said guide member.

28. The linear drive device according to claim 27, wherein said guide member has a field magnet having N- and S-type magnetic poles arranged alternately in said predetermined direction, and said movable piece has an armature coil opposed to said field magnet for generating a thrust in said predetermined direction when energized.

29. The linear drive device according to claim 27, wherein said movable piece is connected to a driven object extending in a direction perpendicular to said predetermined direction.

30. The linear drive device according to claim 29, wherein said driven object is a slider employed in an image reading apparatus for optically scanning and reading an original image and being driven in said predetermined direction together with an optical part carried thereon.

* * * * *